(12) United States Patent
Sappok et al.

(10) Patent No.: US 11,543,365 B2
(45) Date of Patent: Jan. 3, 2023

(54) RADIO FREQUENCY STATE VARIABLE MEASUREMENT SYSTEM AND METHOD

(71) Applicant: CTS CORPORATION, Lisle, IL (US)

(72) Inventors: Alexander Sappok, Cambridge, MA (US); Paul Ragaller, Dorchester, MA (US); Leslie Bromberg, Sharon, MA (US)

(73) Assignee: CTS CORPORATION, Lisle, IL (US)

( * ) Notice: Subject to any disclaimer, the term of this patent is extended or adjusted under 35 U.S.C. 154(b) by 49 days.

(21) Appl. No.: 17/068,097

(22) Filed: Oct. 12, 2020

(65) Prior Publication Data

US 2021/0102904 A1    Apr. 8, 2021

Related U.S. Application Data

(62) Division of application No. 14/733,525, filed on Jun. 8, 2015, now abandoned, and a division of application
(Continued)

(51) Int. Cl.
| | |
|---|---|
| *G01N 15/06* | (2006.01) |
| *G01N 22/00* | (2006.01) |
| *G01N 1/44* | (2006.01) |

(52) U.S. Cl.
CPC ............... *G01N 22/00* (2013.01); *G01N 1/44* (2013.01)

(58) Field of Classification Search
CPC ................................ G01N 22/00; G01N 1/44
See application file for complete search history.

(56) References Cited

U.S. PATENT DOCUMENTS

| | | |
|---|---|---|
| 4,024,452 A | 5/1977 | Seidel |
| 4,042,879 A | 8/1977 | Ho et al. |
| | (Continued) | |

FOREIGN PATENT DOCUMENTS

| | | |
|---|---|---|
| CN | 1032238 A | 4/1989 |
| CN | 101078692 A | 11/2007 |
| | (Continued) | |

OTHER PUBLICATIONS

Rights et al: "Tille Preparation and characterisation of ceria particles," 2013; Retrieved from the Internet: URL:htts:// ::ora.ucc.ie/bitstream/handle/10468/1141 /MorrisVNA_PhD2013 .pdf.
(Continued)

*Primary Examiner* — Alesa Allgood
(74) *Attorney, Agent, or Firm* — Michael Best & Friedrich LLP

(57) ABSTRACT

A measurement system and method of conducting cavity resonance and waveguide measurements is disclosed. The cavity or waveguide may be used to monitor the amount, composition, or distribution of a material or sample contained in the cavity or waveguide or passing through the cavity or waveguide. Improved means for operating the measurement system to reduce measurement variability, improve measurement accuracy, and decrease measurement response times are described. The invention's broad applications range from measurements of filters, catalysts, pipe, and ducts where the material collected in or passing through the cavity or waveguide exhibits dielectric properties different from the material which it displaces.

9 Claims, 25 Drawing Sheets

Related U.S. Application Data

No. 16/878,176, filed on May 19, 2020, now Pat. No. 11,255,799.

(56) References Cited

U.S. PATENT DOCUMENTS

| | | | |
|---|---|---|---|
| 4,477,771 A * | 10/1984 | Nagy | G01N 22/00 60/275 |
| 4,689,553 A | 8/1987 | Haddox | |
| 5,074,112 A | 12/1991 | Walton | |
| 5,103,181 A | 4/1992 | Gaisford et al. | |
| 5,142,595 A | 8/1992 | Chester | |
| 5,157,340 A | 10/1992 | Walton et al. | |
| 5,177,444 A | 1/1993 | Cutmore | |
| 5,369,369 A | 11/1994 | Cutmore | |
| 5,423,180 A | 6/1995 | Nobue et al. | |
| 5,447,635 A | 9/1995 | Viscardi et al. | |
| 5,497,099 A | 3/1996 | Walton | |
| 5,500,599 A | 3/1996 | Stange | |
| 5,557,933 A | 9/1996 | Numata et al. | |
| 5,853,579 A | 12/1998 | Rummler et al. | |
| 6,131,386 A | 10/2000 | Trumble | |
| 6,147,503 A | 11/2000 | Nelson et al. | |
| 6,507,308 B1 | 1/2003 | Ono et al. | |
| 6,630,833 B2 | 10/2003 | Scott | |
| 6,819,849 B1 | 11/2004 | Tangonan et al. | |
| 6,854,261 B2 | 2/2005 | Williamson et al. | |
| 7,157,919 B1 | 1/2007 | Walton | |
| 7,357,822 B2 | 4/2008 | Hamahata et al. | |
| 7,679,374 B2 | 3/2010 | Bromberg et al. | |
| 8,384,396 B2 | 2/2013 | Bromberg et al. | |
| 8,384,397 B2 | 2/2013 | Bromberg et al. | |
| 8,889,221 B2 | 11/2014 | Sappok et al. | |
| 9,144,831 B2 | 9/2015 | Sappok et al. | |
| 9,399,185 B2 | 7/2016 | Bromberg et al. | |
| 9,400,297 B2 | 7/2016 | Bromberg et al. | |
| 10,118,119 B2 | 11/2018 | Sappok et al. | |
| 10,260,400 B2 | 4/2019 | Sappok et al. | |
| 2001/0003898 A1 | 6/2001 | Miller et al. | |
| 2001/0007571 A1 | 7/2001 | Murphy et al. | |
| 2002/0005725 A1 | 1/2002 | Scott | |
| 2004/0200198 A1 | 10/2004 | Inoue et al. | |
| 2005/0011278 A1 | 1/2005 | Brown et al. | |
| 2005/0213548 A1 | 9/2005 | Benson et al. | |
| 2005/0241295 A1 | 11/2005 | Breuer et al. | |
| 2006/0027511 A1 | 2/2006 | Brown et al. | |
| 2006/0070373 A1 | 4/2006 | Huang et al. | |
| 2006/0101793 A1 | 5/2006 | Gregoire et al. | |
| 2006/0138082 A1 | 6/2006 | Strang | |
| 2006/0229466 A1 | 10/2006 | Arhancet et al. | |
| 2007/0000218 A1 | 1/2007 | Wirth et al. | |
| 2007/0022746 A1 | 2/2007 | Decou et al. | |
| 2007/0024289 A1 | 2/2007 | Knitt et al. | |
| 2007/0056274 A1 | 3/2007 | Wills | |
| 2007/0068157 A1 | 3/2007 | Kurtz | |
| 2007/0072567 A1 | 3/2007 | Nagai et al. | |
| 2007/0101705 A1 | 5/2007 | Knitt | |
| 2007/0125075 A1 | 6/2007 | Zanini-Fisher et al. | |
| 2007/0125349 A1 | 6/2007 | Zanini-Fisher et al. | |
| 2007/0130923 A1 | 6/2007 | Dye et al. | |
| 2007/0140134 A1 | 6/2007 | Clark | |
| 2007/0169469 A1 | 7/2007 | Knitt | |
| 2007/0209333 A1 | 9/2007 | Kondou | |
| 2007/0214862 A1 | 9/2007 | Kubinski et al. | |
| 2008/0018442 A1 | 1/2008 | Knitt | |
| 2008/0059093 A1 | 3/2008 | Bromberg et al. | |
| 2008/0066621 A1 | 3/2008 | Naito et al. | |
| 2008/0092499 A1 | 4/2008 | Otsuka et al. | |
| 2008/0110143 A1 | 5/2008 | Chen et al. | |
| 2008/0264036 A1 | 10/2008 | Bellovary | |
| 2009/0033513 A1 | 2/2009 | Salsbury | |
| 2009/0038294 A1 | 2/2009 | Anderson et al. | |
| 2009/0193796 A1 | 8/2009 | Wei et al. | |
| 2009/0295509 A1 | 12/2009 | Master et al. | |
| 2010/0101409 A1 | 4/2010 | Bromberg et al. | |
| 2010/0102828 A1 | 4/2010 | Bromberg et al. | |
| 2010/0212299 A1 | 8/2010 | Jacob et al. | |
| 2010/0262325 A1 | 10/2010 | Fernandez | |
| 2011/0267074 A1 * | 11/2011 | Xie | G01F 1/66 324/629 |
| 2012/0138093 A1 | 6/2012 | Sappok et al. | |
| 2013/0072924 A1 | 3/2013 | Burgener et al. | |
| 2013/0125745 A1 | 5/2013 | Bromberg et al. | |
| 2013/0127478 A1 | 5/2013 | Bromberg et al. | |
| 2013/0298530 A1 | 11/2013 | Carlill et al. | |
| 2014/0116028 A1 | 5/2014 | Sappok et al. | |
| 2015/0123688 A1 | 5/2015 | Sappok et al. | |
| 2015/0132187 A1 | 5/2015 | Takaoka et al. | |
| 2015/0355110 A1 | 12/2015 | Sappok et al. | |
| 2015/0358091 A1 | 12/2015 | Sappok et al. | |
| 2016/0109425 A1 | 4/2016 | Sappok et al. | |
| 2017/0182447 A1 | 6/2017 | Sappok et al. | |
| 2017/0211453 A1 | 7/2017 | Sappok et al. | |
| 2018/0137695 A1 | 5/2018 | Sappok et al. | |
| 2019/0070547 A1 | 3/2019 | Sappok et al. | |

FOREIGN PATENT DOCUMENTS

| | | |
|---|---|---|
| CN | 103841914 A | 6/2014 |
| DE | 3317215 A1 | 11/1983 |
| DE | 102004016725 A1 | 2/2006 |
| EP | 0097416 A1 | 1/1984 |
| EP | 0356040 A2 | 2/1990 |
| JP | 62-95443 A | 5/1987 |
| JP | 3-205543 A | 9/1991 |
| JP | 4-505665 A | 10/1992 |
| JP | H6-201362 A | 7/1994 |
| JP | 2005156523 A | 6/2005 |
| JP | 2006275687 A | 10/2006 |
| JP | 2008-231932 A | 10/2008 |
| JP | 2011-14579 A | 1/2011 |
| JP | 2011007716 A | 1/2011 |
| JP | 2012-507660 A | 3/2012 |
| WO | 92/02807 A1 | 2/1992 |
| WO | 93/05388 A1 | 3/1993 |
| WO | 00/50743 A1 | 8/2000 |
| WO | 2004/074670 A2 | 9/2004 |
| WO | 2005/060653 A2 | 7/2005 |
| WO | 2005/093233 A1 | 10/2005 |
| WO | 2006/002037 A2 | 1/2006 |
| WO | 2007/130896 A2 | 11/2007 |
| WO | 2009031600 A2 | 3/2009 |
| WO | 2010/074812 A1 | 7/2010 |
| WO | 2011/156477 A2 | 12/2011 |
| WO | 2014064406 A1 | 5/2014 |
| WO | 2015/188188 A1 | 12/2015 |
| WO | 2015/188189 A1 | 12/2015 |
| WO | 2017/165220 A1 | 9/2017 |

OTHER PUBLICATIONS

Blaine R. Copenheaver, PCT/US2015/034714, International Search Report, dated Oct. 28, 2015, Patent Cooperation Treaty.

* cited by examiner

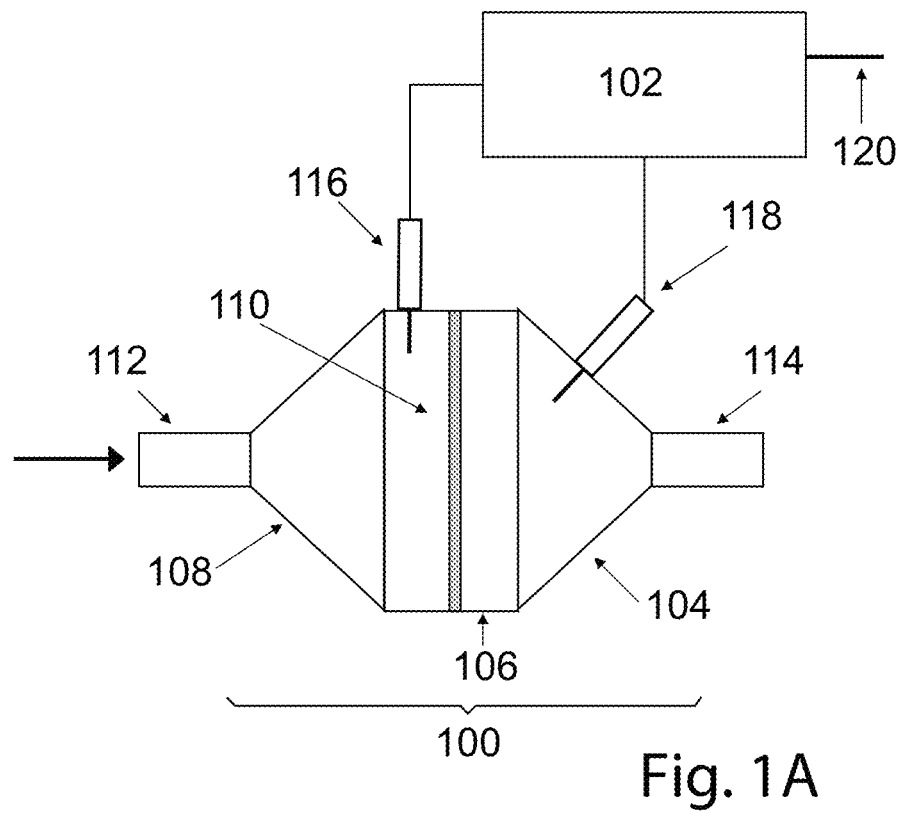
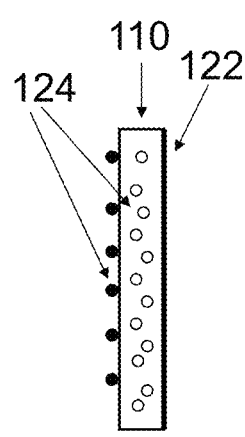
Fig. 1B
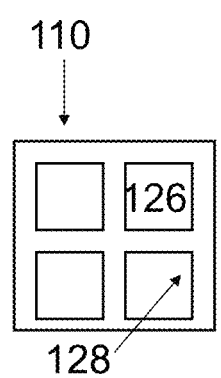
Fig. 1C
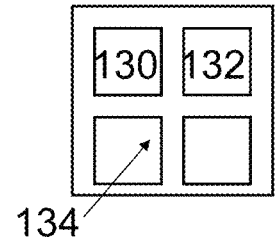
Fig. 1D
Fig. 1A

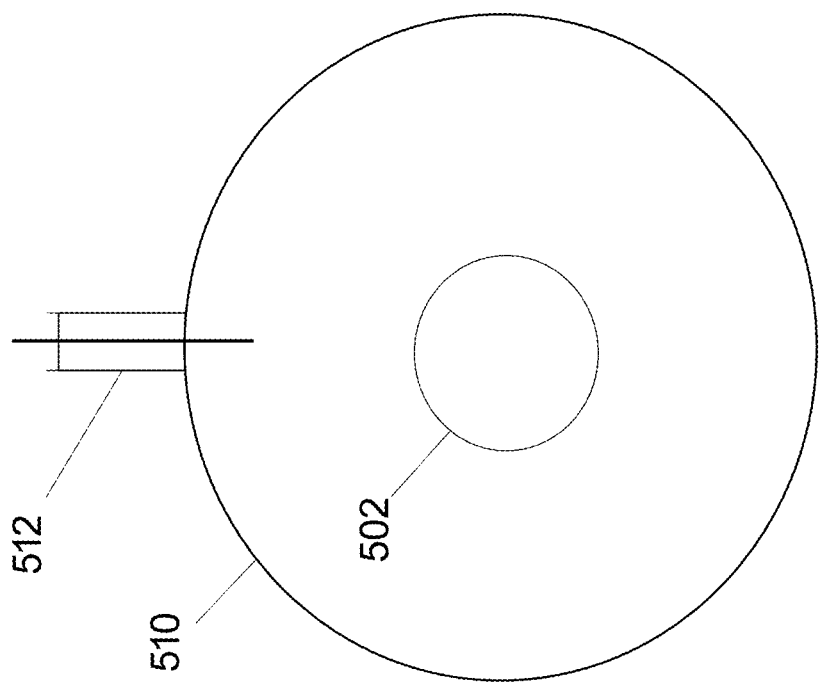
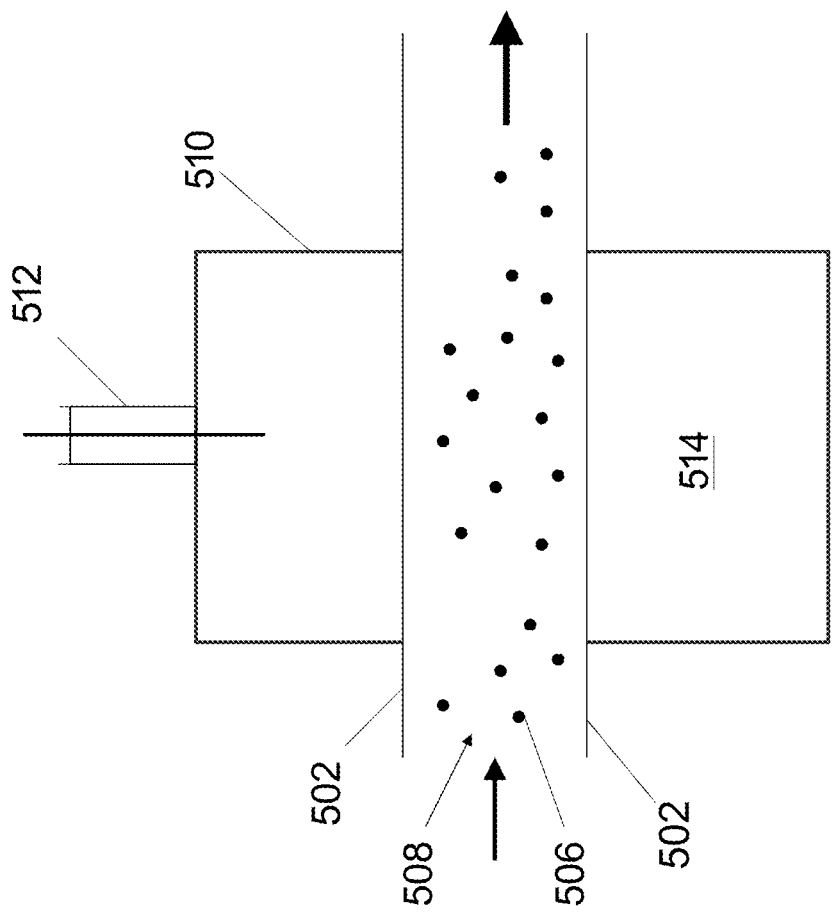

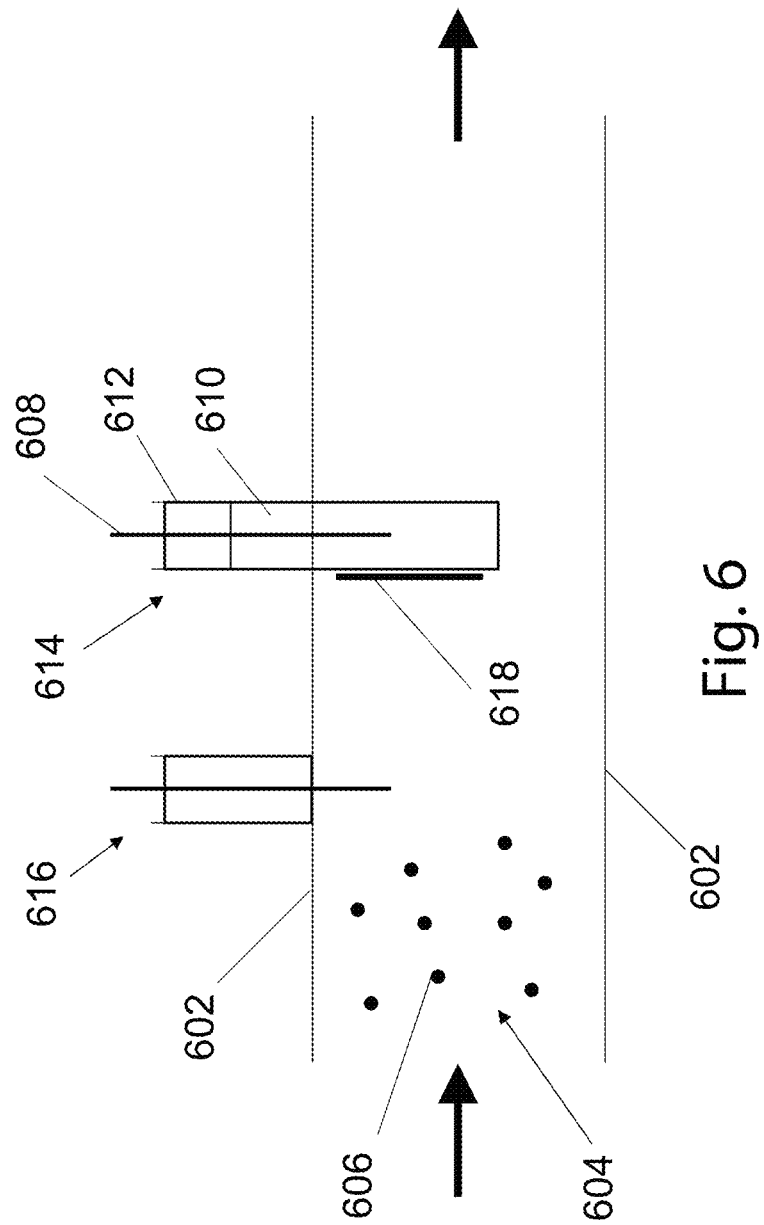

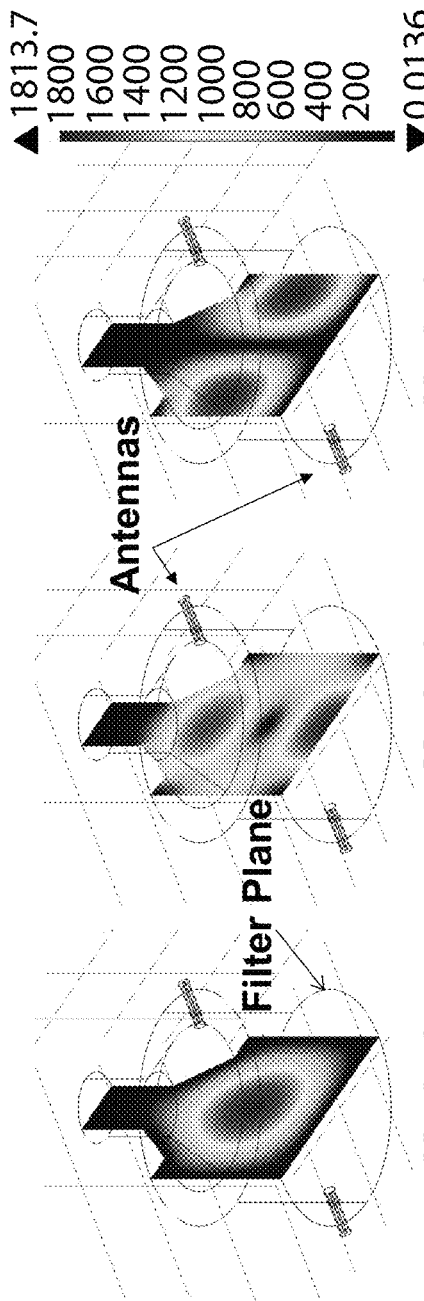
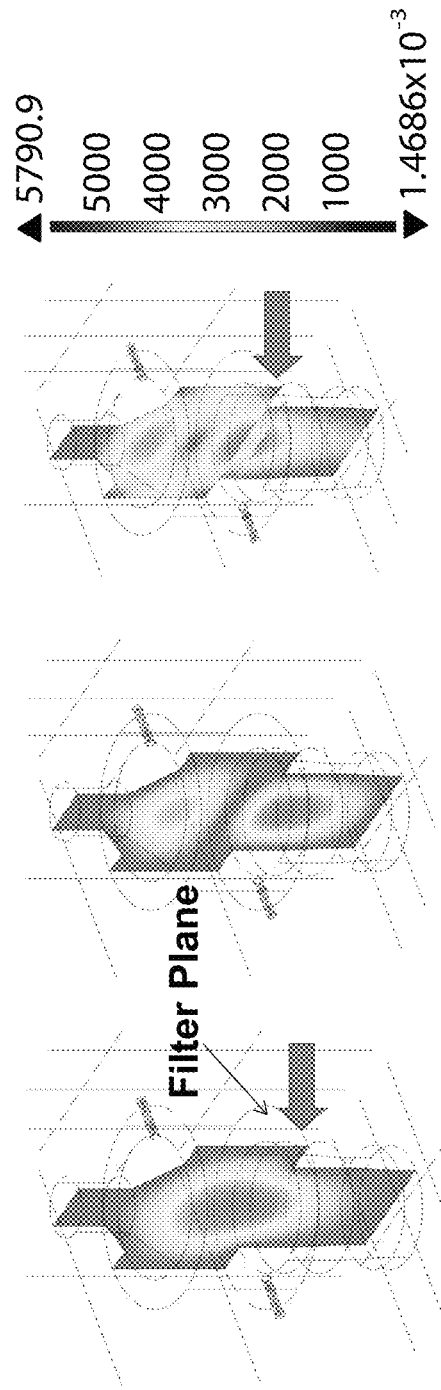

Parameter A: Area under magnitude resonance curve

Parameter B: Phase shift of resonance curve

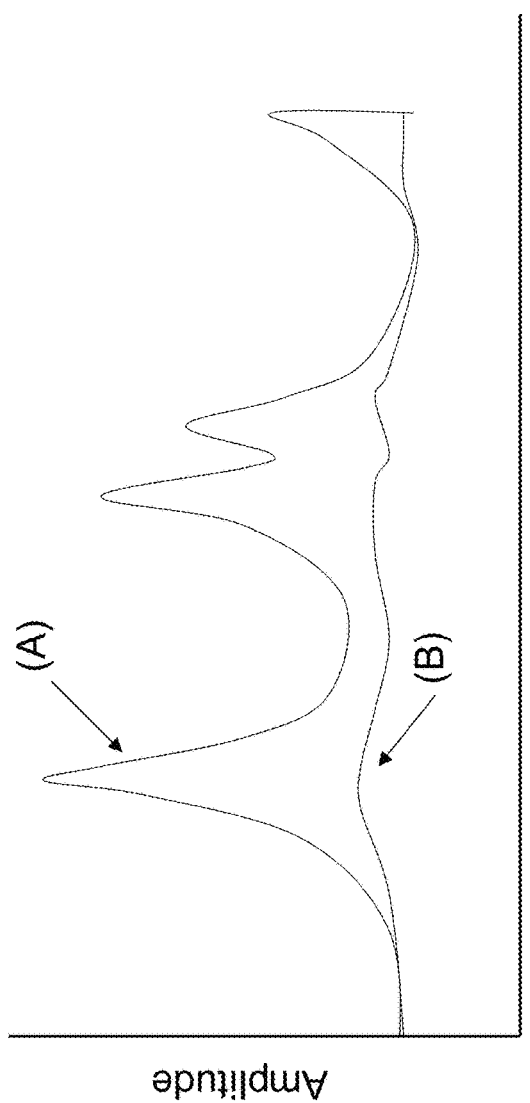
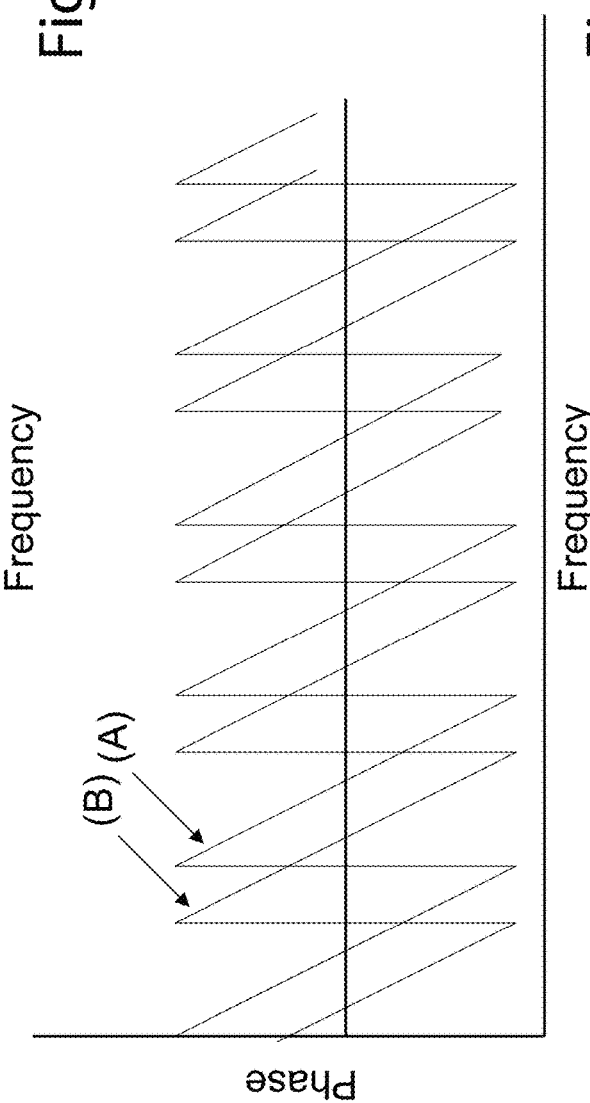

RADIO FREQUENCY STATE VARIABLE MEASUREMENT SYSTEM AND METHOD

This application is a divisional of, and claims priority and the benefit of, U.S. patent application Ser. No. 14/733,525, filed Jun. 8, 2015, the disclosure of which is incorporated herein by reference.

This application is a divisional of, and claims priority and the benefit of, U.S. patent application Ser. No. 16/878,176, filed May 19, 2020, which is a divisional of, and claims priority and the benefit of U.S. patent application Ser. No. 14/733,525, filed Jun. 8, 2015, the disclosure of which is incorporated herein by reference.

This invention was made with government support under Award No. IIP 1330313 awarded by the National Science Foundation. The government has certain rights in the invention.

BACKGROUND OF THE INVENTION

Microwave cavities and waveguides are used in many applications to determine the state of a given system. Examples include monitoring the loading of filters, determining the composition of a blend of materials, detecting moisture content, or measuring the quantity of a specific gas species adsorbed on a catalyst, to name of few applications. Microwave cavity measurements are useful to provide information on the state of the system in situ, without the need for direct contact with the material being monitored. Additional examples to illustrate the broad applicability of microwave-based cavity and transmission measurement systems include: exhaust particulate filters, process catalysts (including emissions catalysts), membranes, and flow-through elements such as pipes or ducts. Although the specific end-use of these systems varies greatly from monitoring air or water in crude oil pipes, to measuring moisture levels in textiles in a clothes dryer, to detecting soot content on a particulate filter or ammonia storage on a selective catalytic reduction system all of these applications share one element in common. The common element employed by all of the aforementioned systems is the use of a conducting cavity or waveguide interrogated through microwave means. Despite the broad applicability, there are a number of disadvantages of microwave cavity and waveguide measurement systems, which adversely affect the measurement accuracy, or have, heretofore, required complex, costly, and cumbersome measures to mitigate.

First, cavity and waveguide measurement systems typically suffer from part-to-part variability, as small changes in cavity or waveguide geometry (due to manufacturing tolerances, thermal expansion/contraction, assembly variations, and other factors) can affect the microwave resonance response and introduce errors into the measurements. In addition, changes to material present within the cavity or waveguide, such as filter elements or catalyst substrates, the presence of conducting elements, or the accumulation of material on the walls, may also adversely affect the microwave response of the system. Changes to the cavity over time, such as the loosening of clamps or other fasteners, of the introduction of certain changes to the cavity geometry, such as dents in one example, may also negatively affect the measurements.

Second, cavity and waveguide measurement systems fundamentally monitor changes in the dielectric properties of the material within the cavity or waveguide, through which the signal propagates. Oftentimes, the dielectric properties of the sample within the cavity may be affected by a number of parameters, which may also introduce errors in the measurement if not properly accounted for. For example, the dielectric properties of the sample within the cavity or waveguide may be a function of the temperature or frequency at which the measurement is conducted, in addition to other parameters. The presence of other substances, water, in one example may also affect the measurements. The impact of these additional parameters, which may be introduced by the measurement method itself or the measurement environment, on the dielectric properties of the sample inside the cavity can, thus, introduce significant errors in the measurements.

Third, the spatial distribution of material inside the cavity or waveguide also affects the measurement sensitivity, based on the specific electric field distribution inside the cavity or waveguide. For material located in a region of the cavity or waveguide with a low electric field, the sensitivity of the measurement to monitor that material will be lower, than if the same amount of material or sample were located in a region of high field strength. Therefore, the sensitivity or measurement response of the system is also directly affected by the distribution of the material with respect to the specific electric field distribution over the measurement frequency range.

Fourth, the implementation of cavity or waveguide measurement systems in process control applications, such as the control of engines, production processes, chemical processing, petroleum extraction, and other applications often requires fast response times for real-time or near real-time feedback control. Many conventional cavity and waveguide measurement systems exhibit relatively slow response, (slower than 1 Hz) and, thus, have limited utility for applications where fast response measurements are required.

Fifth, in applications where the sample or material inside the cavity or passing through the cavity or waveguide exhibits a high degree of dielectric loss, the microwave signal may saturate rapidly, meaning the amplitude becomes difficult to distinguish from the noise. In applications where the cavity or waveguide measurements must be employed with relatively lossy materials, the measurement range may be greatly reduced.

Sixth, in certain applications, particularly in cavity or waveguide measurement systems where more than one type of material may be present and have an effect on the resonance response, it may be difficult to monitor the presence of one specific constituent from a mixture of more than one constituent. In a related application, the constituent's dielectric properties may only be moderately different from the dielectric properties of the media which it displaces in the cavity or the other materials in the mixture, thereby making it difficult to detect (weak sensitivity).

Seventh, the microwave generation and detection systems may not be highly stable, with variations having to do with age, temperature and other environmental characteristics. The strength of the source and/or the response of the detector are variable. Means to accomplish accurate determination of the dielectric characteristics of the cavity need to take into account not only the unit-to-unit variability, but also the temporal variability of the unit.

Therefore, an improved cavity resonance or waveguide measurement system and method are needed, which will have considerable utility for a broad range of applications and fields of use.

SUMMARY OF THE INVENTION

A measurement system and method of conducting cavity resonance and waveguide measurements is disclosed. The cavity or waveguide may be used to monitor the amount, composition, or distribution of a material or sample contained in the cavity or waveguide or passing through the cavity or waveguide. Improved means for operating the measurement system to reduce measurement variability, system stability, improve measurement accuracy, and decrease measurement response times are described. The invention's broad applications range from measurements of filters, catalysts, pipe, and ducts where the material collected in or passing through the cavity or waveguide exhibits dielectric properties different from the material which it displaces.

BRIEF DESCRIPTION OF THE FIGURES

FIGS. 1A, 1B, 1C, and 1D represent one embodiment of a cavity measurement system as well as details of the internal media, which may be a filter, membrane, catalyst, or any other type of media;

FIGS. 5A and 5B represent a second embodiment of a flow-through cavity measurement system;

FIG. 6 represents a third embodiment of a flow-through cavity measurement system;

FIGS. 11A, 11B, 11C, 11D, 11E, and 11F depict specific electric field distributions in two embodiments of a cavity measurement system;

FIGS. 24A and 24B provide a comparison of amplitude and phase measurements over a broad frequency range spanning multiple resonant modes.

DETAILED DESCRIPTION OF THE INVENTION

Figure 2:
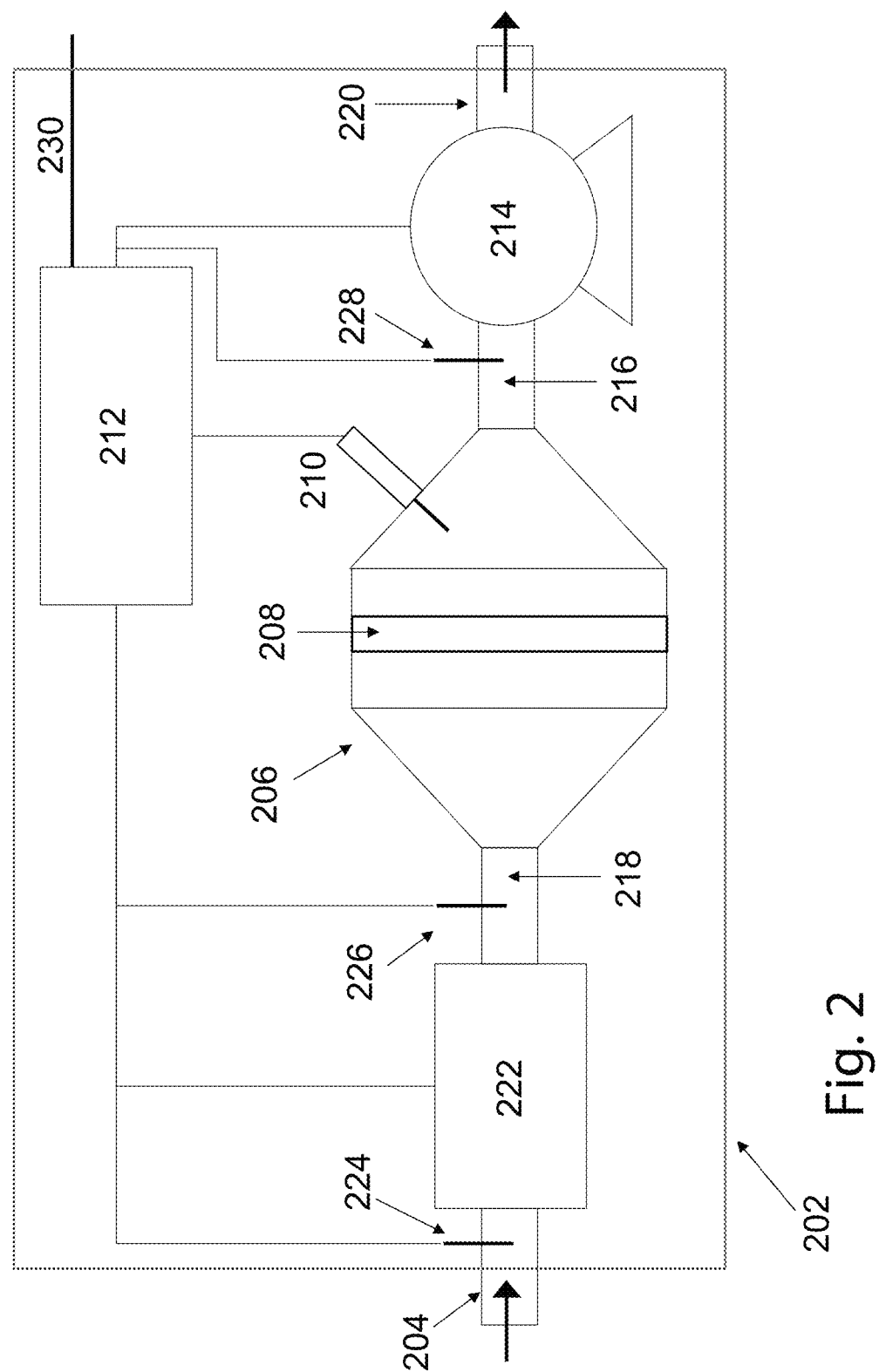
FIG. 2 represents a cavity sampling system containing the measurement cavity of FIGS. 1A, 1B, 1C, and 1D.

FIGS. 1A, 1B, 1C, and 1D depict a cavity measurement system according to one embodiment. A measurement cavity 100 is made up of a housing 106, which may or may not contain an internal element 110. The internal element 110, if present, may be a filter, membrane, ceramic substrate, catalyst support, or the like. The housing 106 may be connected to conduits 112 or 114, such as pipes, tubes, or ducts to direct a flow or sample into housing 106 by means of coupling elements 108 and 104, which may be cones. The coupling elements 108 and 104 and conduits 112 and 114 may or may not be present. In another embodiment, the ends of housing 106 may be closed.

One or more radio frequency probes 116 and 118 may be installed in housing 106, coupling elements 104 or 108, or otherwise suitably positioned to transmit or receive radio frequency signals in housing 106. The transmitted and received signals may be used to generate and sample one or more resonant modes in the measurement cavity 100. Meshes or screens, not shown, may be used to contain the signal inside the volume defined by housing 106 or housing 106 and one or more coupling elements 108 and 104.

The radio frequency probes 116 and 118 may be any type of probe suitable for transmitting or receiving radio frequency signals, such as a rod antenna, loop antenna, waveguide, or any other type of antenna or probe element. The transmitting and/or receiving component can be a dielectric waveguide, resonator or launcher. The dielectric waveguide can be radiative or non-radiative. One or more probes may be used.

Although FIG. 1A shows two probes 116 and 118, only one probe may be used, or more than two probes may be used, in some embodiments. The probes 116 and 118 may be connected to a radio frequency control unit 102. The radio frequency control unit 102 may further be connected to a wiring harness or cable assembly 120 which may supply electrical power to radio frequency control unit 102 or be used to send and receive measurement information or operating instructions from an external device (not shown). In one embodiment, the external device may be another type of control unit, such as an engine control unit, or a computer. External electrical power may or may not be supplied by wiring harness or cable assembly 120. In one embodiment, the radio frequency control unit 102 may be battery operated. The radio frequency control unit 102 may or may not contain a timing device and may or may not contain computer readable storage medium.

The measurement cavity 100 and more specifically, housing 106, may or may not contain an internal element 110. In one embodiment, element 110 may not be present. In another embodiment, element 110 may be present, in the form of a filter element, membrane, supporting substrate, honeycomb structure, and any other type of element designed to interact with the material inside the measurement cavity 100. The interaction may take the form of actively filtering, trapping, or storing material, such as particles, gases, or liquids, which way flow through measurement cavity 100 or be deposited or retained in the measurement cavity 100 in one embodiment. The element 110 may be a conventional paper, Teflon, or quartz type filter, a membrane, a catalyst support, a ceramic honeycomb type filter, a porous media, a mesh, or any other type of element.

In the case of a filter disc, the element 110 may be the same or similar to such elements as the Pall Fiberfilm™, Tissuquartz™, or Emfab™ filter, in one embodiment, however any suitable filter or membrane may be used. The element 110 may or may not be coated with particles 124 or a coating layer 122 on the filter surface, or within the filter pores or fibrous matrix. In one embodiment, the particles 124 may be catalyst particles and the coating layer may be a washcoat 122 or other type of coating.

In the case of a flow through substrate, element 110 may be comprised of a series of channels 126 of any geometry. The channels 126 may or may not contain a coating 128 which may or may not consist of catalyst and or washcoat components. In one embodiment, element 110 may be a conventional automotive or industrial catalyst. In yet another embodiment, channels 132 of element 110 may be blocked at alternating ends 130 such as in a conventional diesel particulate filter or gasoline particulate filter, and may or may not contain a coating 134. Although coatings 134, 128, and 122 are shown on the surface of element 110, the coatings may not be on the surface but rather within the pores of the element 110, in one embodiment. In yet another embodiment, the coatings may or may not contain additional particles dispersed throughout the coating. The particles, may or may not be catalyst particles in one example or zeolites in another example.

In some cases, it may be desirable to modify the element 110 through the addition of coatings 122, 128, 134, or particles 124 which preferentially interact with the sample flowing through measurement cavity 100 or deposited within measurement cavity 100. The interaction may be chemical or physical. In one embodiment, the coatings or particles deposited on element 110 may be functionalized to preferentially trap certain types of materials, or contaminants, such as bacteria or viruses in biological systems, or particles such as soot, ash, or pollen, in air or exhaust filtration systems (or gases, chemical toxic compounds such as warfare agents or Volatile Organic Compounds, VOC's, or water vapor).

In another embodiment, coatings 122, 128, 134, or particles 124 may be designed to preferentially affect the dielectric state of element 110 upon exposure to certain materials flowing through the measurement cavity 100 or deposited within the measurement cavity 100. In another embodiment, coatings 122, 128, 134, or particles 124 may be designed to preferentially affect the dielectric state of element 110 following aging or some time period. Several illustrative examples are provided in the list below, although many other suitable materials may be used for the same or unrelated purposes:

- Storage: Certain particles or coatings may be added to element 110 to preferentially store specific gases, liquids, or solids, where the storage of such components may affect the dielectric properties of element 110. In one example ceria-containing particles or coatings may be applied to element 110 to preferentially store oxygen, the storage of which results in a decreased conductivity of element 110 and a reduced dielectric loss within the cavity. In another example, copper or iron zeolites or the like, may be applied to element 110 to preferentially store ammonia, the storage of which may result in increased dielectric loss of element 110. In yet another embodiment, sulfur may be preferentially stored on various metal oxides such as alkaline earth or alkali metals in the form of a metal sulfate, which may similarly affect the dielectric properties of element 110. In yet another example, element 110 may be coated or contain alkaline earth metals such as barium, alkali metals such as potassium, or rare earth metals, which may be used to store NOx, the storage of which also impacts the dielectric properties of element 110. Although the examples given focus on gas-phase species, particles (solids) and liquid components may similarly be stored, by applying a suitable storage component to element 110. In this manner, both the storage and release of a specific species of interest may be preferentially monitored as long as the storage of the component of interest affects the dielectric properties of the element 110 or measurement cavity 100. The changes can be in either the real part of the dielectric, epsilon-prime, or in the imaginary part of the dielectric, epsilon-double-prime or in both. Alternative to the imaginary part of the dielectric constant, epsilon-double prime, the electrical conductivity of the material can be affected.
- Oxidation/Reduction: Particles, such as catalyst particles, or coatings may be added to element 110 to oxidize certain components either stored on element 110 or passing through element 110. Platinum or other precious metals are one example. In one embodiment, a precious metal catalyst or precious metal-containing catalyst coating may be applied and used to oxidize soot. In another embodiment, the oxidation may be of hydrocarbons or carbon monoxide, but the oxidation may be of any material. In both cases, the oxidation process or input or result thereof results in a change in the dielectric state of element 110 which may be monitored via microwave means. The change in the dielectric state may be due to the formation of the oxidation products or the loss or release of the initial reactants. Other oxidation processes may be monitored through similar means. Other particles or coatings, aside from precious metal containing particles or coatings may also be used. Similarly, particles, such as catalyst particles, or coatings may be added to element 110 to reduce certain components either stored on element 110 or passing through element 110, which may be detected via microwave means provided that the loss of the reactants or the formation of the reaction products affect the dielectric properties of element 110 or measurement cavity 100. Although the examples given focus on gas-phase species, particles (solids) and liquid components may similarly be oxidized or reduced, by applying a suitable storage component to element 110.
- Aging: Particles, such as catalyst particles, or coatings may be added to element 110 to provide an indication of the aging state of the element 110, its performance, or the aging or state of the catalyst. In one example, the aging may be physical or chemical. In a particular example, the aging may be due to the loss of active sites, particle sintering, or agglomeration, which may affect the dielectric properties and can be monitored via microwave means. In another example, the aging may be due to chemical interactions or poisoning of the catalyst by contaminant materials. In yet another example, the poisoning may be through sulfur or phosphorous contamination and may be reversible (such as by high temperature desulfation in one example) or irreversible.

The illustrative examples provided above, are broadly applicable. A wide range of particles or coatings may be used to preferentially control the properties of element 110 such that:

1. The coating or particles deposited on or within element 110 are selected to preferentially interact with one or more materials (gas, liquid, or solid) which may be present in the measurement cavity 100; and
2. The interaction, whether through selective storage, oxidation, reduction, aging, or some other means, results in a more pronounced change in the dielectric properties of element 110 or measurement cavity 100 than would naturally occur without the addition of said particles or coatings.

Furthermore, the addition of the particles or coating may not be restricted solely to element 110, but also to internal surfaces of one or more components comprising measurement cavity 100. Similarly, the monitored changes in the dielectric properties may or may not occur on element 110 but merely within measurement cavity 100.

Although the additional of particles or coatings to preferentially control the properties of element 110 in order to enhance the detection of certain process (storage, oxidation/reduction, aging) by microwave means have been described, the additional particles or coatings may not be needed in some embodiments and the desired processes may be monitored directly by changes in the dielectric properties of element 110 itself or existing coatings already present on 110 such as an SCR coating (copper or iron zeolites) in one example, or an oxidation coating in another example.

One distinguishing aspect of the present invention is that the additional particles or coatings, termed "dielectric-sensitive" particles or coatings added to element 110 serve primarily a diagnostic or sensing purpose, that is to enhance radio frequency measurements of the state of element 110 rather than to improve or support its primary function. One non-limiting example is an SCR catalyst, where the addition of a "dielectric-sensitive" particle or coating does not serve to enhance the ammonia storage or NOx conversion of the catalyst, but rather serves the purpose of enhancing radio frequency sensing of the catalyst ammonia storage levels, aging state, number of active sites, overall health or integrity, poisoning, or the like.

The applications of the cavity measurement system shown in FIGS. 1A, 1B, 1C, and 1D and the addition of particles and coatings to the interior of measurement cavity 100, whether on element 110 or internal component parts of measurement cavity 100, are widespread. One specific application includes automotive and industrial catalysts. The applied particles or coatings may be conventional catalysts and coatings, such as for a three-way catalyst, lean NOx trap, selective catalytic reduction system, oxidation catalyst, catalyzed particulate filter (gasoline or diesel), hydrocarbon trap, ammonia slip catalyst, or any other type of catalyst, where the catalyst housing forms a microwave resonant cavity or waveguide. The monitored changes in the resonance curves may be related to the chemical (such as chemisorption) or physical processes occurring on the catalyst, such as oxygen storage, ammonia storage, NOx storage, soot storage, ash storage, soot oxidation, hydrocarbon oxidation or storage, CO oxidation, and other processes. The monitored changes in the cavity resonances may be based on resonant frequency shift, absolute power attenuation, relative power attenuation, or phase shift, as well as parameters derived there from such as quality factor, peak width at a specific power level, area under the curve, average power, and related parameters.

Absolute power attenuation is defined herein as the change in the measured magnitude of the RF signal from a predetermined magnitude, whereas relative power is defined as the change in the measured magnitude of the RF signal passing through the cavity or waveguide from the generated RF signal input to the cavity or waveguide. The magnitude of the generated RF signal may be determined continuously for every measurement or intermittently at a specified interval. One exemplary means for determining the magnitude of the generated RF signal is by means of a by-pass path which circumvents the measurement cavity or waveguide and transmits the generated RF signal directly back to the detector. The relative power attenuation may then be determined by comparing the bypass signal to the signal obtained from the cavity or waveguide measurements. In the same manner, absolute phase shift and relative phase shift may also be determined.

In one embodiment, the radio frequency control unit 102 can be in communication with two detectors, and both the signal going through the measurement cavity and the bypass signal can be measured simultaneously. In a different embodiment with a single detector, the measurement is sequential; that is, measuring first one signal and then the second one (for example, measuring the signal through the measurement cavity and then measuring the signal when the measurement cavity is bypassed). It is possible to make the frequency scan of one of these signals, followed by a frequency scan of the other signal. The scan of the bypass signal may be carried out at every scan, or it may be done periodically (after a determined number of scans through the measurement cavity). In addition, it may be possible to have different frequencies ranges, in order to increase the time response of the signal through the measurement cavity. In an alternative measurement mode, both signals (the signal through the measurement cavity and the bypass signal) are measured at the same frequency and then the frequency is changed in order to complete a frequency scan.

The monitoring of the two signals enables the use of different transmitted power during specific measurements or at different conditions. For example, in conditions when the signal to noise ratio is high, it would be possible to decrease the transmitted power, while monitoring the power input to the measurement cavity by monitoring the bypassed signal. Similarly, if the signal to noise ratio is low, it enables the use of increased power. One mode of operation would be to continuously adjust the input power until a desired target amplitude of the signal through the measurement cavity is measured, and then use the power generated as the variable that is used to determine the condition of the measurement cavity. There may be one or more target measured signals levels, depending on the condition of the measurement cavity.

A doping material placed or introduced in the cavity could also be used to monitor the temperature the component. For example, Fischer-Tropsh or methanol catalysts are very sensitive to local temperature excursion that damage the catalyst or result in undesirable products (in the case of Fischer/Tropsch, heavy waxes that can plug the reactor). By placing materials that are temperature sensitive in the cavity, it is possible to remotely monitor the temperature of the reactor, which now is done only by measuring the temperature upstream or downstream from the reactor or through obstructive thermocouples that only measure very local temperatures. The doping material has a temperature sensitive dielectric constant. The doping material can be selected so that either the real part (refractive index) or the imaginary part (absorption) of the dielectric material is temperature sensitive, or both. The temperature information can be extracted from the absolute amplitude, relative amplitude, resonant frequency shift, phase or quality factor of the microwave signal. The unit can be continuously calibrated by dithering of the conditions in the reactor, either by adjusting the inlet temperature of the reagents or the composition of the inlet, such that the temperature of the reactor is oscillating around a base value. In another embodiment, the doping material may not be sensitive to temperature but may be sensitive to any other interactions with material in the cavity, such as chemical or physical interactions with a particular species, which affect the dielectric properties of the doping material.

The monitored changes in the microwave cavity response may be used to control the operation of the cavity or a device, piece of equipment, plant, process, or related system based on the cavity measurements. In one application, the radio frequency control unit 102 samples the measurement cavity 100 resonance curve, which may include one or more than one resonant mode, and monitors or computes one or more measurement parameters related to resonance frequency shift, absolute amplitude, relative amplitude or phase or a derivative thereof. One or more of these resonance parameters may be related to the state of the cavity, which may be characterized by the amount of a specific material accumulated or stored in the cavity, the type of material within the cavity, such as the material composition, or the distribution of material in the cavity based on the distribution of the electric fields associated with a specific resonant mode.

The change in the cavity measurement parameters may be used to monitor the operation of a particular process or monitor the health of the element 110 within the cavity. In one embodiment, the element 110 may be a conventional automotive or industrial catalyst designed to reduce emissions of CO, HC, NOx, or soot. Although the primary function of the catalyst may be to reduce one or more exhaust emissions, the catalyst may also be subject to contamination, poisoning or fouling such as from sulfur, in one example. The addition of particles 124 or coating 122, 128, or 132 designed to selectively store a contaminant component, such as sulfur, or enhance sulfur storage selectivity over other components, such as the use of silver, zinc, nickel, chromium, or copper alone or in addition to alkaline earth or alkali metals, may enable increased sensitivity to store and therefore measure sulfur or other contaminant levels on the catalyst via microwave means before the overall performance of the catalyst is significantly affected. In this manner, the addition of the particles 124 or coating 122, 128, or 134 serves a diagnostic purpose. Similarly, the change in dielectric properties of the element 110 or measurement cavity 100 due to particles 124 or coating 122, 128, or 134 may serve to provide an indication of the aging or degradation of system performance over time. Many other similar embodiments exist, in other applications ranging from pharmaceuticals processing, petroleum extraction and refining, water purification, fuel cell membranes, and others.

The specific examples provided above are further illustrated by the requirements defined below, such that the particles or coatings applied to element 110 or to one or more interior surfaces of measurement cavity 100 serve a primarily diagnostic function defined to:

1. Increase the selectivity or enhance the overall storage, deposition, or trapping of one or more component species of interest within measurement cavity 100; or
2. Enhance or amplify the effect of one or more component species of interest on the dielectric properties of element 110 or within the interior volume of measurement cavity 100; and
3. Where the component species of interest is not the same species directly affected by the primary function of the element 110.

Examples to illustrate the requirements listed above include the addition of sulfur or phosphorous selective material (particles, coatings, or the like) to conventional three-way catalysts, where the primary function of the catalyst are not to trap sulfur or phosphorous but to reduce emissions of CO, HC, or NOx. However, in this case, the sulfur or phosphorous selective material amplifies the effect of sulfur or phosphorous on the cavity dielectric properties, thereby enabling the detection of sulfur or phosphorous levels directly which, if excessive, can deleteriously affect system performance. In this manner, the primary purpose of the additional particles or coatings is purely diagnostic in nature, that is, it enhances the measurement of specific system parameters that provide an indication of the health or functionality of the system. In yet another embodiment, the additional particles or coatings may not be used to monitor additional contaminants, but rather as an indication of the effectiveness or degradation of the catalyst or element 110 itself. In yet another embodiment, the condition of the catalyst or element 110 may be monitored directly without the need for additional materials to enhance its dielectric response, by monitoring the change in the catalyst's dielectric response directly.

In addition to monitoring conventional processes, substances can be added to the flow to determine the performance of the unit. For example, a foreign material can be added to the flow to interact with these particles or with the substrate such that the RF measurement indicated the health of the component. For example, if the particles or coating sensing materials are located downstream in the unit, the health of the material upstream of the unit can be determined by measurement downstream (damage such as break of the filter properties (crack or melting), or sintering of the catalyst/substrate that minimizes the available holding of the unit, or local temperature). Assume soot sensing elements are added in the exhaust channels of the DPF, for example, and they are monitored using the microwave sensor. If soot is detected there, that means that the DPF has failed somewhere. For the case of ammonia, if there is an additive added at or near the end of the catalyst, indication of the presence of the ammonia in this additive indicates imminent breakthrough of the ammonia into the exhaust stream.

The system described in FIG. 1 could be a flowing system, as in automotive applications, or a batch system, such as in chemical reactors. In the case of the batch system, the process will determine the degree of conversion of the reagents, the rate of conversion and other parameters, such as temperature or pressure.

FIG. 2 presents one embodiment of an integrated sampling and cavity measurement system 202. An inlet 204 and 218 such as a pipe, tube, or duct in one embodiment may be connected to a cavity 206 which may or may not contain element 208. Cavity 206 may also contain one or more RF probes 210 designed to transmit or receive radio frequency signals, such as a rod antenna, loop antenna, waveguide or any other suitable transmission or reception device. Cavity 206 may also be connected to an outlet 216 and 220 such as a pipe, duct, tube, or device providing a similar function.

FIG. 2 also shows unit 214, which may be a blower, pump, engine, or similar system which may induce a sample to flow through cavity 206 and may or may not also include an outlet 220, such as a pipe, tube or duct, or the like. Although the flow direction is indicated from left-to-right by the arrows in FIG. 2, the flow may be in the reverse direction. Unit 214 may or may not be used. Unit 214 may be connected to control unit 212, which may or may not provide power to unit 214 or control the operation of unit 214. In another embodiment, unit 214 may be upstream of cavity 206. Control unit 212 may contain a timing device in one embodiment to determine the time associated with a particular measurement, or the time difference between measurements, in one embodiment.

Control unit 212 may also be connected to one or more RF probes 210 to transmit, receive, and process radio frequency signals. Signal processing may include the calculation of various parameters, described in reference to FIG. 1, from the radio frequency signals. Additional sensors 224, 226, and 228, such as temperature sensors, flow sensors, pressure sensors, humidity sensors, or composition sensors may also be present in the system and connected to control unit 212. Input from these additional sensors 224, 226, and 228 may be used by control unit 212 to control the operation of the sampling and cavity measurement system 202. Connection 230 may be used to provide power to control unit 212 or to various components of cavity measurement system 202 or also to provide a communication or data link to various other systems (not shown), such as a computer or master control unit, for example.

Additional sample conditioning units, such as conditioning unit 222 may also be present. In one embodiment, conditioning unit 222 may provide temperature control, such as a heater or chiller. In another embodiment, conditioning unit 222 may remove moisture from the incoming sample, acting as a desiccant, or remove or separate other components from the sample, such as by filtration or membrane separation. In another embodiment, conditioning unit 222 may provide flow control and/or flow measurement for the system. In other embodiments, conditioning unit 222 introduces into the flow a foreign substance that can be used to determine the performance of the system, or to calibrate its performance. In yet another embodiment, the flow may be controlled by unit 214. In another embodiment, the composition of the flow can be varied to determine the time response of the dielectric characteristics of the element 208 in the cavity 206. In some embodiments, conditioning unit 222 may not be required and, in other embodiments, more than one conditioning unit 222 may be used.

In another embodiment, the conditions of cavity 206 may also be controlled, such as by controlling the temperature of the cavity (heating or cooling the walls in one example), or by controlling the interior volume cavity 206 such as by filling all or partially with a dielectric, gas, liquid, or solid, such as a dielectric for loading of the cavity.

Element 208 may be a filter, membrane, honeycomb support, such as a catalyst support, or any other element, similar to the element 110 described in reference to FIG. 1. Element 208 may or may not contain particles or other coatings. Element 208 may or may not be used.

The operation of a preferred embodiment of the system shown in FIG. 2 may be as a sampling system, where a unit 214, which may be a sample pump, is controlled by control unit 212 to draw a sample flow (solids, liquids, or gas) through cavity 206 by means of the piping connections 204, 218, 216, and exhausted via outlet 220. The flow rate may be controlled by control unit 212, such as by varying the operation of unit 214. Conditioning unit 222 may be an electrical heater in one embodiment, or contain a desiccant in another embodiment, to provide a sample flow of controlled temperature and moisture content into cavity 206. Conditioning unit 222 may perform multiple functions in another embodiment. The operation of conditioning unit 222 may be controlled based on input from additional sensors 224 and 226 located before and after conditioning unit 222, respectively, such as temperature sensors to provide closed loop temperature control, in one embodiment. Additional sensors including pressure sensors, moisture sensors, composition sensors, and even the RF probe 210 and the like may also be used. In this manner, the properties, such as temperature, moisture content, composition, and related properties of the sample stream entering cavity 206 may be well controlled.

Element 208 may or may not be present. If present, element 208 may interact with the sample stream, such as by trapping certain components via a filter or membrane in one example, or chemically reacting with specific sample components in another example, such as chemical storage on element 208 or reaction with element 208, or physically reacting with such specific sample component (absorption/adsorption). In another example, sample stream may interact with the interior surface of cavity 206.

RF Probe 210 may transmit and receive a radio frequency signal within cavity 206. More than one probe may be present in another embodiment. Measurements may consist of transmission S12 or S21 or reflection S11 or S22 measurements, over one or more cavity resonant modes. Control unit 212 may control the operation of RF probe 210 and others, if present. Changes in the dielectric properties within cavity 206 or on element 208 due to the sample stream may be detected by monitoring changes in one or more resonant modes, including the regions between resonances, which may be related to specific properties of the sample. The sample properties that may be monitored include the quantity of a particular constituent, the distribution of a constituent (based on the electric field distribution of one or more cavity resonant modes), the type or composition of the constituent, or even a change in state of element 208, whether or not due to the sample.

The sample stream may or may not be continuous and may or may not flow through cavity 206. In one embodiment, the sample stream may be intermittent. In another embodiment, a sample may be placed inside cavity 206 such as by physically opening cavity 206 and manually placing the sample within cavity 206 or dumping or filling the sample through inlet 204. In another embodiment, unit 214 may draw the sample through cavity 206. In yet another embodiment, a pressure differential may be used to induce the sample to flow through cavity 206 with or without the use of unit 214.

In a preferred embodiment, sampling and cavity measurement system 202 is a particle measurement instrument, which may be used to sample or monitor particles in the ambient environment or from a source such as an exhaust system. In another embodiment, sampling and cavity measurement system 202 is a liquid composition measurement system used to measure the relative proportion or composition of a liquid blend, which may includes gases, liquids or solids.

If the flow contains non-uniformities that are a fraction of the wavelength in the cavity, it would be possible to monitor the velocity of the flow using the microwave signal through non-contact means. As regions of different concentration move through the gradient in the electric field (because of the resonant-mode structure of the electric field), there is a response in the microwave field (absolute amplitude, relative amplitude, resonant frequency shift, phase or quality factor) that is associated with the flowing speed. For example, in addition to determining the water content in an pipe in which there is oil flow, the rapid shift in microwave response enables the determination of the velocity of the flow in the cavity. The non-uniformities can be embedded in the flow (such as water in oil), or it can be added (adding a material to the flow), or can be created by cavitation, where bubbles are created.

An important advantage of cavity measurement system 202 is the ability to accurately control sample conditions entering cavity 206 as well as the conditions of cavity 206. Control of the sample conditions, such as temperature, flow rate, moisture content, composition, and other parameters significantly reduce sources of error on the cavity resonance measurements, thereby enabling more accurate measurements. In addition to controlling the sample properties, measurements from additional sensors 224, 226, and 228 may also be used to provide compensation of the cavity resonance measurements.

Figure 3:
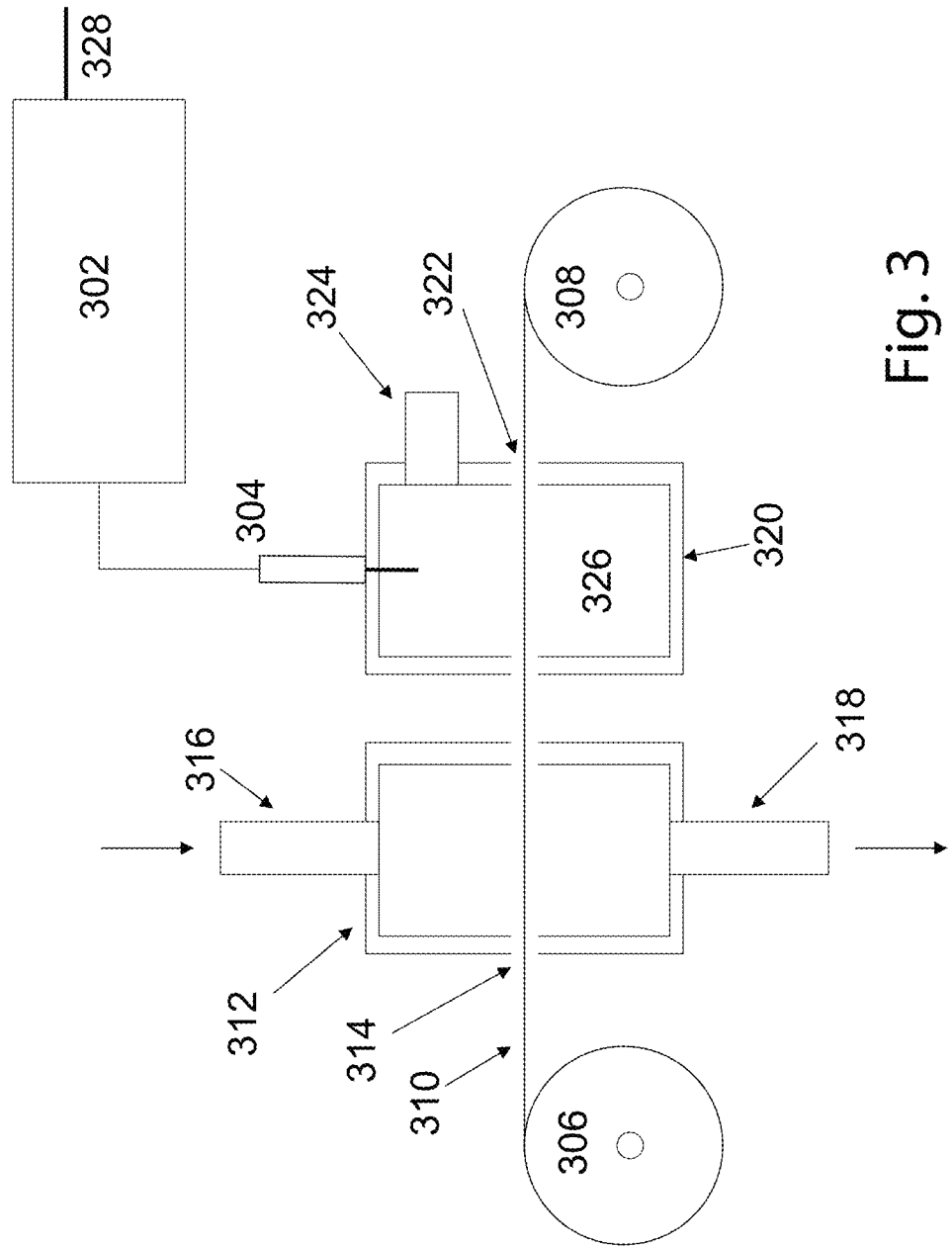
FIG. 3 represents a second embodiment of a cavity sampling system.

FIG. 3 presents another embodiment of a sampling and cavity measurement system. Similar to the elements 110 and 208, FIG. 3 shows the element 310 in the form of a strip which may be fed or advanced by means of rolls 306 or 308. In one example, the element 310 may be a filter strip, or membrane strip, but any suitable strip or roll of material may be used. Element 310 is shown to pass through sample cavity 312 and measurement cavity 320, which are shown in a cross-sectional view. Cavities 312 and 320 may be separate cavities in one embodiment or may be the same cavity in another embodiment. Openings 314 and 322, such as slits or holes or gaps, enable element 310 to pass through cavities 312 and 320. Although openings 314 and 322 are depicted as void spaces in FIG. 3, the openings may be sealed (not shown) during a portion or all of the operation. In one embodiment, cavity 312 or 320 may not be one single component but composed of an assembly of components, such as two halves separated about the line defined by element 310 which may open to allow element 310 to advance and then close to firmly hold element 310 in place while also sealing off the cavity 312 or 320.

Sample cavity 312 may contain one or more openings or connection ports 316 and 318 to allow for a sample to enter or exit the cavity. In the case where element 310 is a filter element, a portion of the sample may become trapped on the filter, while the remainder exits the cavity 312. Sample cavity 312 may also not contain any openings or connection ports, but instead require that one or more portions of the cavity 312 be removed to allow for sample deposition on element 310 inside the cavity 312. Alternatively, the sample may also be deposited on element 310 outside cavity 312.

Measurement cavity 320 may contain one or more radio frequency probes 304 and one or more ports 324. The probe 304 may be a rod antenna, loop antenna, waveguide, or any other suitable probe for transmitting or receiving wireless signals, such as dielectric waveguides, resonators or launchers. Probe 304 may be connected to control unit 302, which may generate and detect radio frequency signals and also carry out signal processing. Control unit 302 may also be connected to connection 328 which may provide a connection for power or communication signals.

Interior volume 326 of measurement cavity 320 may or may not be fully or partially filled with a material. The material may be a solid, liquid, or gas. In one example, interior volume 326 may be filled with a dielectric material, such as to load measurement cavity 320 to preferentially shift the resonance modes to lower frequencies. In one example, a preferred material may be alumina, but other materials may also be used. In another embodiment, interior surface of measurement cavity 320 may be coated with a highly conductive material, such as gold, silver or copper to improve cavity quality factor, Q. In yet another embodiment, interior volume 326 may be filled with an inert gas, and, in another example, interior volume 326 may be an oxidizing or reducing environment. The composition and properties of the interior volume 326 may be controlled by introducing or evacuating material through port 324.

In one embodiment, element 310 is first advanced a predetermined amount by rotating rolls 306 and 308. A sample stream may be introduced into sample cavity 312 through inlet connection 316 and may exit cavity 312 through outlet connection 318. In one embodiment, the sample stream may be a continuous or intermittent flow, generated by a pump, blower, or similar device connected to connection 316 or 318. In another embodiment, the sample stream may be driven by a pressure gradient, such as by connecting 316 or 318 to a high or low pressure reservoir.

A portion or all of the sample stream may be collected, trapped, deposited, adsorbed, or may otherwise interact with all or portion of element 310. One objective of sample cavity 312 is to facilitate interaction of some or all of the sample stream with element 310. During or following the sample collection period, the conditions inside sample cavity 312 or outside cavity 312 may be controlled such as by modifying the temperature, humidity, or environmental composition to preferentially pre-condition element 310. Pre-conditioning element 310, such as by maintaining element 310 at a specified temperature or moisture level, in one example, reduces such sources of error on the radio frequency measurements. Deposition of solid matter in the sample on the filter element 310 may be enhanced by inertial deposition (through accelerating the flow and separating the particulate matter from the fluid flow) or through electrostatic (as in electrostatic precipitators) or magnetic (as in high gradient magnetic separation) effects.

Following a pre-determined sampling time, element 310 may be advanced into measurement cavity 320. Element 310 may be advanced continuously or following a delay period. Element 310 may be advanced to transport any collected sample or the results of the sample interaction with element 310 into measurement cavity 320. Once inside measurement cavity 320, element 310 may be interrogated by radio frequency means. One or more probes 304 may be used to transmit radio frequency signals into measurement cavity 320 across a frequency range sufficient to generate one or more than one cavity resonant mode. In another embodiment, the signal may not be at resonance and may be at one specific frequency or at multiple frequencies. One or more probes 304 may receive the transmitted signal. The receiving probe 304 may be the same as the transmitting probe 304 or a separate probe (not pictured).

Control unit 302 may generate and transmit the radio frequency signal and also detect the received signal. Control unit 302 may further process the radio frequency signal, such as through the application of calibration algorithms or transfer functions, to relate the change in the signal parameters to the state variable of interest. Control unit 302 may further determine when to advance element 310 by controlling the speed or starting and stopping rolls 306 and 308. Control unit 302 may also regulate the sample conditioning such as the temperature, humidity, or environment within the measurement cavity 320. In another embodiment, control unit 302 may operate a valve or pump (not shown) connected to port 324 to introduce or evacuate material from interior volume 326.

In another embodiment, radio frequency measurements of cavity 320, such as sampling one or more resonance curves or a discrete frequency range or specific frequency with or without temperature variation of the sample, may be conducted by control unit 302 to determine the quantity, type, or distribution of material collected, adsorbed, or in some other manner deposited or trapped on element 310. In another embodiment, control unit 302 may measure changes in the properties of element 310 itself, such as due to interactions with the sample of sample stream. In one example, the interactions may include the deposition of particles or liquids on element 310 and the measurements conducted by control unit 302 may be to determine the quantity of the particles or liquids collected on element 310. In one embodiment, the measurement system depicted in FIG. 3 is a soot or black carbon measurement system. In another embodiment, the measurement system depicted in FIG. 3 is a gas or liquid sensor.

In one embodiment, the sampling process is conducted in sampling cavity 312 while the radio frequency measurements are conducted in measurement cavity 320 in order to separate the sampling and measurement environments and provide a controlled environment to carry out the radio frequency measurements in cavity 320. In this embodiment, additional means (not pictured) may or may not be used to further condition element 310 such as by temperature control, heating of cavity 312 or cavity 320 or heating of element 310 directly through contact or non contact means. Other means of conditioning element 310 are also possible. Separation of the sampling and measurement processes in two or more cavities 312 or 320 enables sampling and sample conditioning independent of the radio frequency measurements. In one embodiment, sampling conditions may vary greatly, while subsequent radio frequency cavity measurements may be carried out under much more controlled conditions, thereby reducing any error in the measurements, which would otherwise be induced by the varying sampling conditions.

In another embodiment, additional cavities or zones may be present (not pictured in FIG. 3) to enable additional conditioning or treatment of the sample entering or exiting sample cavity 312. In yet another embodiment, additional cavities or zones may be present between cavity 312 and cavity 320 to further condition the sample, such as by additional heaters or blowers in one example. In yet another embodiment, the functions of sampling cavity 312 and measurement cavity 320 may be combined into a single cavity. The measurement system depicted in FIG. 3, thus allows for careful control and conditioning of element 310 and the measurement environment within cavity 320 to enhance radio frequency measurement accuracy by reducing or eliminating the effects of variables which would otherwise negatively impact the measurements. By varying the temperature of sample during the measurement, or frequency of the RF signal to include low and high frequency ranges, additional information on the loading and composition of the material deposited on the sample can be obtained.

It may be possible to externally add a known amount of a substance to the flow, in order to assist in characterizing the performance of the system and/or to help in calibration.

Figure 4:
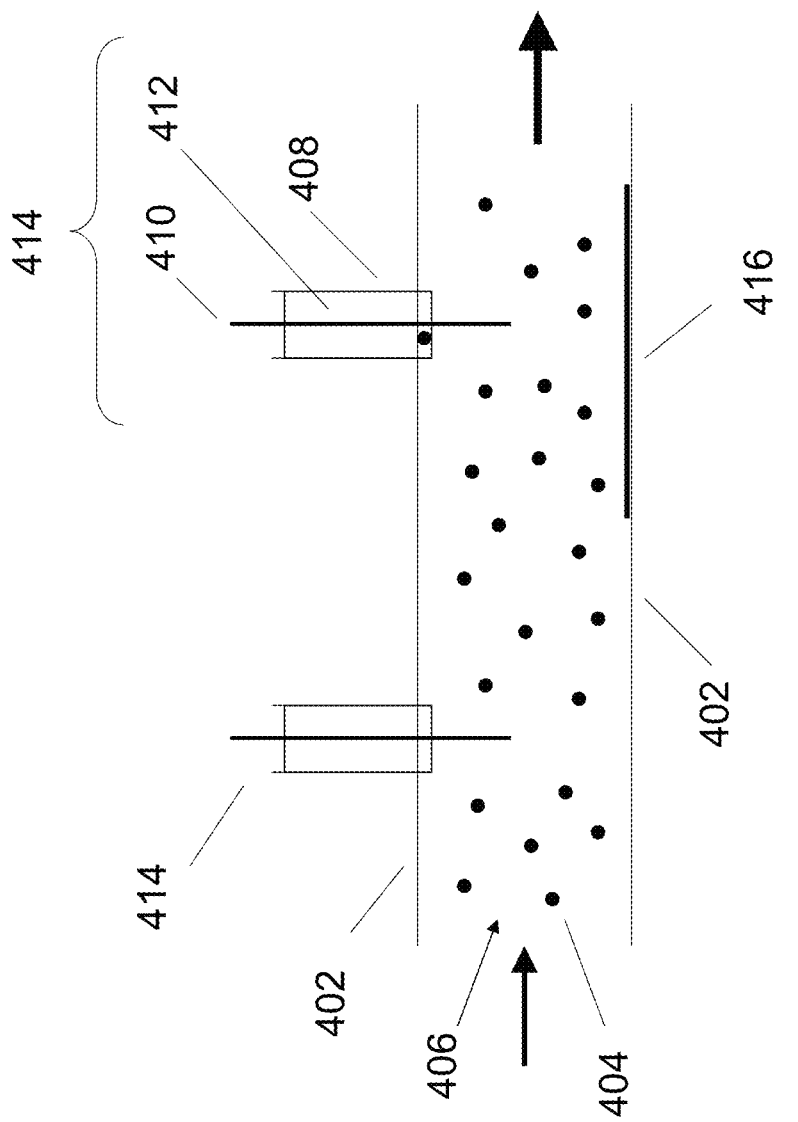
FIG. 4 represents one embodiment of a flow-through cavity or waveguide measurement system.

FIG. 4 depicts another embodiment of a radio frequency cavity or waveguide measurement system in which the cavity 402 is of a flow through design such as a pipe, conduit, tube, duct, or similar passage. One or more materials 406 or 404, such as any type of solid, liquid, or gas phase material, may flow through or reside within the interior volume of cavity 402. One or more radio frequency probes 414 may be connected to the walls of cavity 402 and may or may not extend through the walls of cavity 402. Probes 414 may be rod or loop antennas, waveguides, or any other suitable device for transmitting or receiving radio frequency signals, including dielectric waveguides, launchers and resonators.

In one embodiment, probe 414 may be a rod antenna comprised of an outer conductor 408, an inner dielectric 412 and an inner conductor 410, although other types of antennas and other designs are also possible. A mesh, screen, or other perforated conductive element (not shown) may or may not be used to contain or isolate the radio frequency signal within a specific region of cavity 402. A control unit (not pictured) may be used to control the transmission or detection of a radio frequency signal from probe 414. The radio frequency signal may span a range of frequencies such as to generate one or more than one cavity resonant mode. In another embodiment, the signal may not be at resonance. Although FIG. 4 shows two probes 414, one probe or more than one probe may be used to conduct transmission, reflection, or transmission and reflection measurements.

Changes in the radio frequency signal, including a change in absolute amplitude, relative amplitude, phase, resonant frequency of a resonant mode or readily distinguishable feature of the resonant curve, such as quality factor Q, a trough, side band, or degenerate mode, (or a derivative thereof) may be monitored to detect the amount, type, distribution, or other state variable related to one or more materials 406 or 404 contained within or passing through cavity 402 or deposited on a interior surface of cavity 402 such as 416. In one embodiment, the state variable of interest is the amount of particles 404 in a gas or liquid stream 406 or the fraction of gas (bubbles) in a liquid stream.

In another embodiment, the state variable of interest is the quantity or relative proportion of one or more materials that may be present, such as a blend of liquids, solids, or gases. In another example, the amount of water in oil may be measured, or the relative proportion of ethanol or in gasoline or biodiesel in diesel. In another example, the flow rate of an inhomogenous media can be determined. In yet another example, the temperature of the media can be determined. In yet another example, the state variable of interest may be the quantity of one or more materials 406 or 404 accumulated on the walls of cavity 402, shown as a build-up of material 416. The quantity of a gas entrained in a liquid (i.e., bubbles) may also be measured in this manner. In yet another example, the amount of material 416 accumulated within a pipe, duct or conduit 402 may also be detected, such as sludge build-up in a pipe or soot deposition along a conduit. In the case of accumulation of particulate material 416, the deposition rate can be increased by either cyclonic action (i.e., due to inertial forces) or electromagnetic means (i.e., electrostatic or magnetostatic precipitation) or thermophoretic means (i.e. temperature gradient). In the case of electrostatic precipitation, the particles need to be charged, either naturally charged (as in engine exhaust) or charged by introducing charges into the flow. In the case of magnetic precipitation, the particles need to be magnetic (diamagnetic, paramagnetic or ferromagnetic).

In one embodiment, a flow is directed through cavity 402, which may contain any type of solid, liquid, or gas phase materials. One or more than one probe 414 may be used to establish one or more resonant modes within cavity 402. The monitored change in the resonance characteristics or some derivative thereof, may be related to the state variable of interest, such as the quantity of a specific component contained in the flow, or a characteristic of the flow such as the flow rate, temperature, or other relevant parameter. In yet another embodiment, resonance may not be established within cavity 402 and changes in the radio frequency signal at a non-resonant condition may be monitored.

As mentioned above, non-flowing systems can also be monitored, such as for example, batch chemical reactors. The sample measurement in FIG. 3 can be done in a batch mode.

In another embodiment, cavity or waveguide 402 may be a long section or network of sections, (such as a network of pipes or ducts in one example) with various branches, interconnects, transitions, or bends. One or more probes 414 may be mounted at various locations along waveguide or cavity 402 and used to transmit radio frequency signals through cavity 402 for purposes of detecting failures or defects of the walls or surfaces of waveguide or cavity 402, such as in a pipeline or exhaust system inspection. In one example, frequency domain reflectometry or time domain reflectometry may be used to determine the number and location of possible faults. Monitoring changes in the radio frequency signal response as a function of time provides information on the degradation or changes in the cavity or waveguide 402 over time.

FIGS. 5A and 5B depict a variation of the flow-through cavity measurement system shown in FIG. 4, where the measurement probe is located remotely from the sample stream. A non-conducting conduit 502, which may be a conduit, pipe, duct, tube, or similar structure, may contain flowing or stationary sample material 506 or 508, similar to the material 406 or 404 described in reference to FIG. 4, such as any solid, liquid, or gas. A conducting cavity 510 may be positioned around a portion or all of non-conducting conduit 502. The conducting cavity 510 serves as the radio frequency measurement cavity and may contain one or more than one radio frequency probe 512, such as an antenna or waveguide. In FIG. 5, the interior of non-conducting conduit 502 and the surrounding conducting cavity 510 are depicted in an annular configuration, however any geometry and configuration may be used. Non-conducting conduit 502 need not be located in the center of conducting cavity 510 in one embodiment, but may be located in the center of conducting cavity 510 in another embodiment. Conducting cavity 510 may contain an interior volume 514 which may or may not be fully- or partially-filled. In one embodiment, interior volume 514 may be fully or partially-filled filled with a dielectric to load the cavity.

The purpose of non-conducting conduit 502 may be to contain the sample material within a specific region of conducting cavity 510. In one example, non-conducting conduit 502 may be a hose or pipe, such as a rubber or plastic hose or pipe, or glass or ceramic tube. In another embodiment, non-conducting conduit 502 may serve to direct the sample material 506 or 508 into a region of high electric field within conducting cavity 510 in order to increase the measurement sensitivity. In another embodiment non-conducting conduit 502 may serve to direct the sample material 506 or 508 into a region of low electric field within conducting cavity 510 in order to decrease the measurement sensitivity. In yet another embodiment, the position of non-conducting conduit 502 within conducting cavity 510 and relative to probe 512 may be variable to enable changes in the position of non-conducting conduit 502 relative to the electric field within conducting cavity 510 in order to adjust the sensitivity by moving non-conducting conduit 502 from one region of high field to a region of low field or vice versa.

The measurement system depicted in FIGS. 5A and 5B separates conducting cavity 510 from the sample material 508 or 506 and enables radio frequency measurements, including cavity resonance measurements of sample material 508 or 506. Such separation may be preferred to avoid exposing the conducting cavity 510 or probe 512 to the sample material 506 or 508 directly, or to avoid the introduction of additional connections, fittings, or seals which could leak or otherwise provide avenues for sample material 506 or 508 to escape from conducting cavity 510. In one example, non-conducting conduit 502 may be a fuel line or hose, or petroleum line. Non-conducting conduit 502 offers safe separation between the electrically driven antenna and the fuel, preventing situations where an electric signal functions as an ignitor to the fuel.

The measurements conducted within conducting cavity 510 may or may not include one or more than one resonant mode. In one embodiment, conducting cavity 510 may be an annular cavity designed to slip or slide over a non-conducting conduit 502, such as a pipe, or may be of a clamshell design in another example and may be mounted in a fixed position or in a variable position. Radio frequency resonance measurements, or measurements at frequencies other than resonance may be used to determine one or more parameters to describe the state of the sample material 508 or 506 within non-conducting conduit 502 or to monitor the buildup of material on the interior or exterior surfaces of non-conducting conduit 502 or to detect changes in the structure of non-conducting conduit 502, such as may be induced by cracking, fatigue, corrosion, or some other means. In one embodiment, the position of conducting cavity 510 may be moved such as by sliding or rotation to monitor different locations or sections of non-conducting conduit 502. In another embodiment, the conditions within the interior volume 514 may be controlled such as by temperature control in one example.

FIG. 6 presents another embodiment of a cavity or waveguide measurement system in which a conduit 602 serves as the cavity or waveguide and may contain sample materials 606 or 604, which may be composed of one or more constituents. One or more probes 614 or 616 may be installed in conduit 602 in order to transmit or receive radio frequency signals.

In particular, a probe design, 614, is shown; the probe 614 being comprised of a conductive outer sleeve 612, an inner conductor 608, and a dielectric material 610 which fully-or partially encases or surrounds inner conductor 608. In one embodiment, dielectric material 610 extends beyond the end of inner conductor 608 such that inner conductor 608 is fully-encased. Material contained within conduit 602 may deposit on dielectric material 610 shown as deposited material 618. The quantity, type, or other attributes of sample material 606 or 604, may therefore be detected by means of its build-up or accumulation on dielectric material 610. In one embodiment, dielectric material 610 may be a ceramic or plastic material. In another embodiment, the shape of the dielectric material 610 may be of any shape suitably designed to interact in a preferential manner with the sample material 606 or 604, such as by having a large surface area for example.

Only one probe 614 may be used, with or without the addition of probe 616 or additional probes (not shown). The spacing of outer surface of dielectric material 610 from inner conductor 608 may be preferentially determined such that deposited material 618 is deposited, accumulated, or interacts with dielectric material 610 in a region of high electric field strength to increase the measurement sensitivity or low electric field strength to decrease the measurement sensitivity. The measurements may be conducted at resonance or at any suitable frequency or frequency range or ranges, at one temperature or at multiple temperatures. A suitable frequency may be defined as a frequency or frequency range that maximizes the measurement sensitivity and/or selectivity to the specific sample material 606 or 604. In one example, deposited material 618 may be soot or particles and conduit 602 may be an exhaust pipe. In another embodiment, dielectric material 610 may be periodically or continuously cleaned or reconditioned to remove the deposited material 618 such as by heating, manually, or some other physical or chemical processes. The performance of the device can be monitored and/or calibrated by the use of artificial introduction of a known quantity of material (solid, liquid or gaseous).

In another embodiment, dielectric material 610 may be designed to interact with the sample material 606 or 604 in any number of ways. In one example, the interaction may be chemical, whereby dielectric material 610 may be impregnated, coated, or functionalized, by the addition of one or more catalysts or additional materials. The functionalization of dielectric material 610 may serve to preferentially interact with one or more than one constituents comprising the sample material 604 or 606. In one example, dielectric material 610 may be functionalized using zeolites to trap or store specific gas-phase species, such as ammonia, in one example. Alternatively, other materials could be used, such as tin-oxides and other metal-oxide semiconductors. In some of these cases, the electrical resistivity of the material changes after gas exposure. By using RF sensing, disconnected particles can be used (each disconnected particle being a single crystal, difficult to grow in substantial size), eliminating the need for a large single crystal particle or a continuous coating, such as those used in low frequency/DC measurements. Selectivity and sensitivity can be enhanced by surface absorption/desorption that results in changes in electrical conductivity. Multilayers or functionalized structures for increasing selectivity and sensitivity can also be used.

In this example, probe 614 may be a gas sensor. In another example, dielectric material 610 may be a porous ceramic designed to absorb water or some other liquid or vapor. The interaction of one or more sample materials with dielectric material 610 may serve to alter its dielectric state, which may be detected by measured changes in the signal response at resonance or any other suitable frequency. In this manner the element previously described and defined as element 110 in reference to FIGS. 1A, 1B, 1C, and 1D, element 208 in reference to FIG. 2, and element 310 in reference to FIG. 3 may be integrated with the radio frequency probe 614 shown in FIG. 6. In this manner, dielectric material 610 serves as the element previously defined as a separate element in reference to FIGS. 1A, 1B, 1C, 1D, 2, and 3 such that the two elements are the same. In another example, the radio frequency probe 614 shown in FIG. 6 may be used in conjunction with an additional element, such as element 110 in reference to FIGS. 1A, 1B, 1C, and 1D, element 208 in reference to FIG. 2, and element 310 in reference to FIG. 3 such that the elements are separate elements.

Figure 7:
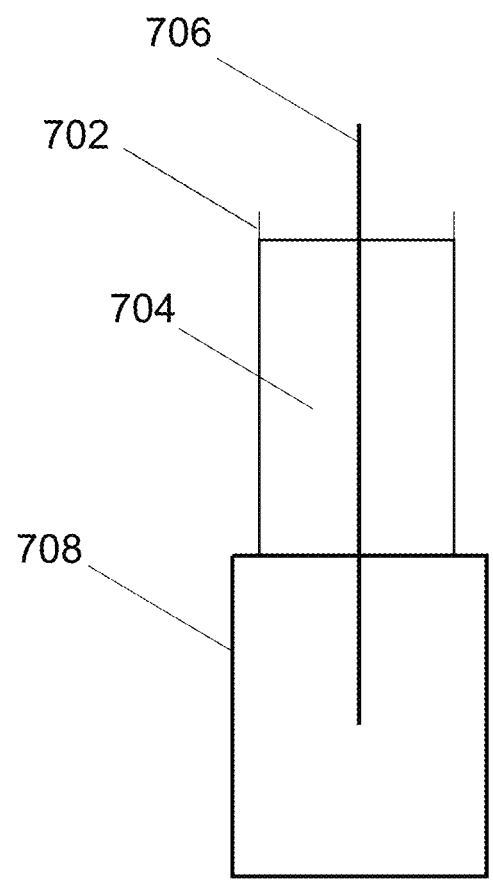
FIG. 7 represents one embodiment of a radio frequency probe.

FIG. 7. depicts another embodiment of a probe with an integrated cavity, which consists of an outer conductive sleeve 702, which may be in electrical contact with an outer sheath 708, outer sheath 708 being perforated, having slits or one or more openings, or a mesh of a design suitable to allow material to pass through but of a mesh or perforation size to fully or partially contain the radio frequency signal within the outer sheath 708. The probe may further contain an inner conductor 706, such as a rod antenna or loop, such as in a rod antenna or loop antenna, including dielectric waveguides, launchers and resonators. An inner dielectric 704 may or may not be used, and may fully- or partially cover or surround inner conductor 706. In another example, inner dielectric 704 may fill the entire volume defined by outer sheath 708. Inner dielectric 704 may be composed of ceramic material, fibrous material or any other suitable material. Inner dielectric 704 may be of different or varying composition within the probe, such that the inner dielectric 704 completely or partially extending into the outer sheath 708 may be of different material than the material residing within the outer conductive sleeve 702. In one embodiment, inner conductor 706 may not be used, such as in a waveguide.

The measurement probe shown in FIG. 7 provides an integrated cavity with the probe assembly and does not require the use of an external cavity, such as a conductive conduit, but may be used installed in any conduit (not pictured) or in free space. Radio-frequency signals at one or more resonant modes, or any suitable frequency or frequencies confined to the cavity formed by outer sheath 708 may be affected by material passing through the porous outer sheath 708 or deposited on outer sheath 708 itself.

A particular advantage of the system shown in FIG. 7 is that the probe may be used in any operating environment, as the measurements within the region defined by outer sheath 708 are unaffected by the presence of external conducting elements. In particular, cavity or waveguide measurements using existing conduit or cavities are affected by the geometry and size of the conduit or cavity, such that a system designed to operate with a 24 inch diameter pipe for example may require recalibration or operation at different frequencies than with a 2 inch diameter pipe. Fixing the outer sheath 708 to the outer conductive sleeve 702 directly eliminates any variation when the probe assembly shown in FIG. 7 is installed in different external cavities or conduits (not pictured).

The use of dielectric waveguides or resonators is very attractive in this embodiment. One attractive feature of dielectric waveguides or resonators for this application, is that is would not need the sheath, as the radiation is evanescent outside of the waveguide. However, there are electric fields on the surface of the waveguide that can be used to probe the material on the surface.

Figure 8:
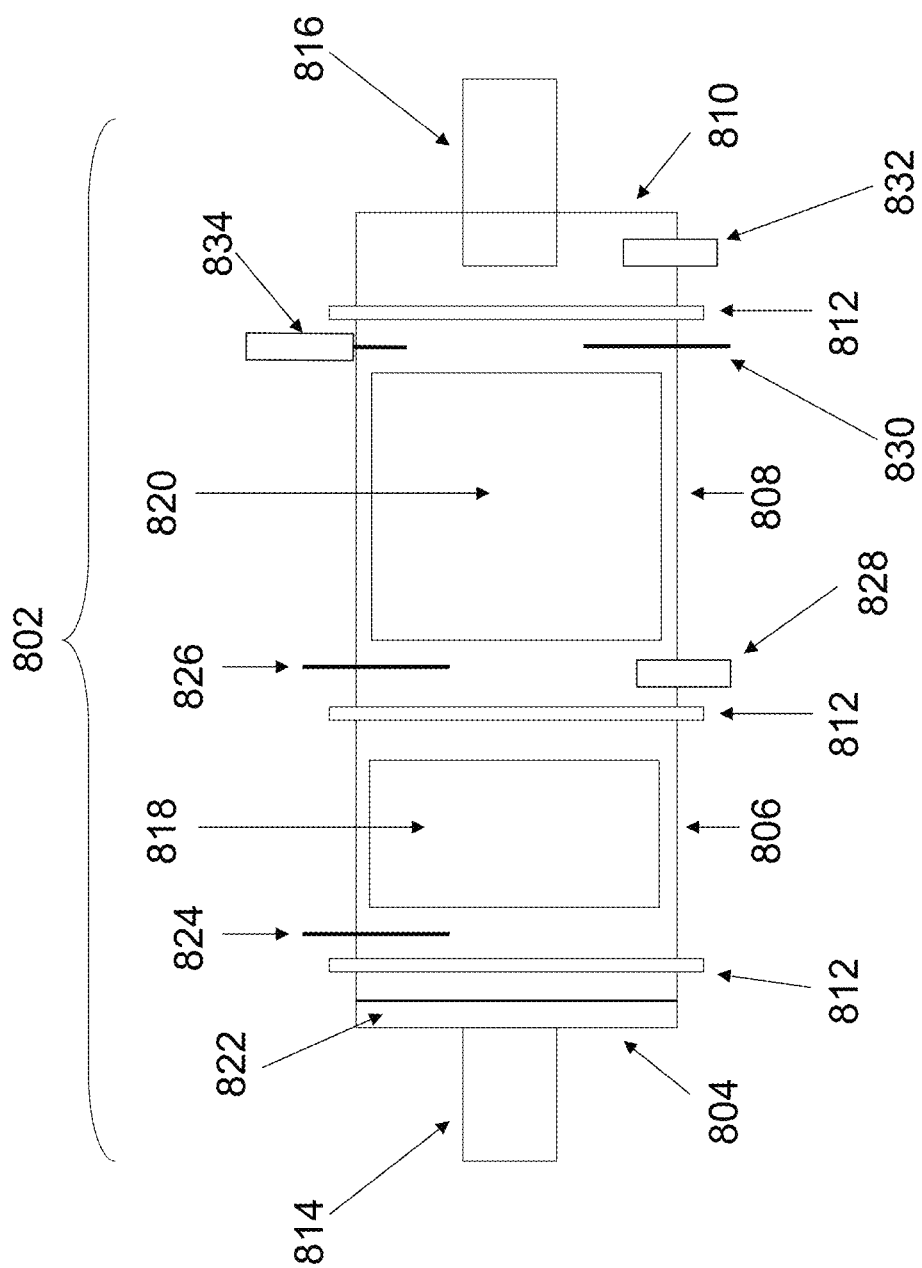
FIG. 8 represents one embodiment of an emission control cavity measurement system.

A specific cavity assembly 802 is shown in FIG. 8, which may be a filter or catalyst system or some combination thereof in one embodiment. In one example, cavity assembly 802 is a diesel or gasoline particulate filter or catalyst assembly, such as a three-way catalyst, selective catalytic reduction system, lean NOx trap, ammonia slip catalyst, hydrocarbon trap, or any other type of catalyst. In another embodiment, cavity assembly 802 can be any type of cavity. Cavity assembly 802 may be comprised of an inlet section 804, first module 806, second module 808, and outlet section 810. An inlet conduit 814 may be connected to inlet section 804 and an outlet conduit 816 may be connected to outlet section 810. Inlet or outlet conduits 814 or 816 may or may not extend into inlet or outlet sections 804 or 810. Inlet and outlet sections 804 and 810 as well as modules 806 and 808 may be connected by interconnects 812, such as flanges, clamps, or similar means, as shown in FIG. 8. Elements 818 and 820 may be contained with modules 806 and 808, respectively. Although two elements and modules are shown, multiple configurations are possible, with only one element and module, or more than one element and module, or multiple elements contained within a single module. In one embodiment, elements 818 and 820 are catalysts, filters, membranes, or some combination thereof.

In one example, element 818 may be an oxidation catalyst or three-way catalyst, and element 820 may be a gasoline or diesel particulate filter. In another embodiment, element 820 may be an ammonia slip catalyst and element 818 may be an SCR catalyst.

Additional elements 822, such as baffles, passages, mixing plates or tubes, and the like, may also be contained within one or more sections, or modules. Conduits 816 or 814 may or may not extend into outlet section 810 or inlet section 804. These elements may or may not be conducting. In one example, additional element 822 is a baffle or flow distribution plate.

Additional structures, probes, sensors, or other elements 824, 826, 828, 830, 832, or 834 may also extend into the interior of modules 806 or 808 or inlet or outlet sections 804 or 810. In one embodiment, additional structures 824, 826, 828, may be temperature sensors, and additional structures 828 or 832 may be oxygen sensors, NOx sensors, soot sensors, ammonia sensors, or the like. Probe 834 may be a radio frequency measurement probe, such as a rod antenna loop antenna or waveguide, including dielectric waveguides, launchers and resonators. Probe 834 may further be configured to transmit and receive radio frequency signals sufficient to generate one or more than one resonant mode within cavity assembly 802 or over any frequency range or ranges. One or more than one probe 834 may be used. Probe 834 may monitor the processes occurring on elements 818 or 820 or within the volume defined by cavity assembly 802 or a region within cavity assembly 802.

In another embodiment, probe 834 may be a multi-function sensor such as a combined radio frequency probe and temperature sensor in one example.

The presence of inner conducting elements, such as the probes, baffles, conduits, and the like, described above, may influence the electric field distribution with cavity assembly 802. The inner conducting elements may be designed and positioned to minimize disturbances to the electric field, such as installation at local field minima, or, in another embodiment, to preferentially influence the electric field distribution. Cavity modifications to geometry or interior structures, such as the addition of fins, baffles, and conducting elements, may also be used to preferentially influence the electric field distribution and increase measurement sensitivity in particular regions of the cavity assembly 802.

The radio frequency response of cavity assembly 802 is influenced by geometry of the modules 806 and 808, inlet and outlet sections 804 and 810 and inner conducting elements, probes, sensors, and the like 822, 824, 826, 828, 830, 832, as well as the interconnects 812. The type of elements 818 and 820, as well as their position within modules 806 and 808, respectively, may also influence the radio frequency measurements. Further the geometry, location and mounting of probe 834 as well as the operation of radio frequency control unit, including attached cabling (not shown), may also affect the measurements. In order to reduce these sources of variability, the measured radio frequency signal at any point in time may be normalized to a known reference state by one or both of the following means:

Normalize Full Signal: (i) Transmit and detect a radio frequency signal over the desired frequency range to generate one or more than one resonant mode, or over any frequency range regardless of whether or not resonance is established. (ii) Divide or subtract each subsequently sampled frequency range by or from the signal sampled for the reference state at each same discrete frequency point for either the measured amplitude or phase.

Normalize Signal Parameter: (i) Transmit and detect a radio frequency signal over the desired frequency range to generate one or more than one resonant mode, or over any frequency range regardless of whether or not resonance is established. (ii) Compute one or more characteristic parameters from the radio frequency amplitude or phase signal sampled for the reference case including but not limited to: area, local or absolute maxima or minima, average, quality factor, peak width for resonance at a given power level, phase shift, resonant frequency shift, or any derivative parameters thereof. (iii) Compute the same parameter as in (ii) for a subsequently sampled signal and divide or subtract this value by or from the value for the reference condition.

In the above-listed cases, the reference signal or value may be a pre-determined reference signal or value, such as when the system is new or clean or at some reference state (installation at the manufacturer in one example) and exist as a stored value in the control unit or expert system.

In another example, the transmitted and detected signals above may refer to a signal that is corrected by the strength of the transmitter, which may produce a signal amplitude that is not stable. In this case, the transmitted and detected signal may be continuously or periodically corrected by sampling the generated RF signal such as by means of a bypass pathway to circumvent the RF cavity or waveguide.

In this manner, the normalization will account for any part-to-part variability and reduce measurement error for cavities containing variations on geometry or internal elements. This normalization scheme considerably reduces the problem of part-to-part variability, geometric tolerances, misalignment of the various components, signal drift, and the like.

There are multiple means of improving the signal to noise ratio when doing cavity measurements. Their embodiments are described below.

It is possible to monitor preferentially local regions in the cavity by using near fields of the antenna. The resonant modes have a complex structure for field peaks and field nulls. However, the fields can be substantially higher near the launching structure, which can be an antenna, a loop, or a dielectric waveguide. The use of dielectric waveguide is attractive, in the case of non-radiative waveguide, in that substantially higher frequencies can be used than those that can be supported by the cavity or waveguide (without the use of screens or meshes). Without the screen or the mesh, the radiation would leak out through the inlet or outlet ports of the aftertreatment component.

Signal processing can be used to improve the signal to noise ratio. Around each resonance, it is possible to fit a curve to the microwave response, either amplitude or phase. The curve fitting allows, for example, to extract quality factor information, even though the difference between the peak and the trough of the signal is less than the 3 dB needed for a conventional measurement of Q. Many fits can be used, and different functional dependence of the signal on the frequency can be used in different modes. When the signal is well behaved, a fit on the analytic form of $A/((\omega-\omega_0)^2+$ $D^2$) where w is the frequency and the other parameters are calculated by curve-fitting. However, other functional forms can be used.

Another method for signal processing that can be used to improve signal to noise ratio is to perform an average of the signal (S11, S21, S22 or S12). There are modules that calculate these elements (amplitude and phase) and produce an output that is analog or digital. Instead of discretizing a single measurement, by doing a short average of the signal prior to discretizing, it is possible to reduce the noise. The averaging can be done by a quick analog-to-digital module that then performs a digital average, or it can be done analog, with the integrated value discretized and stored. The analog average can be performed by the use of simple integrators. It is important to make the integration after the transients that occur after hopping from frequency to frequency have died down. The process reduces the time require to decrease the signal-to-noise ratio compared to taking single discrete measurement, and averaging over several scans over the frequency.

Another method to improve the signal to noise ratio is to locate the receiving antenna at a field null, for a particular mode. The signal would be 0 or very low in baseline conditions (say, when there is no oxygen stored on the TWC in one example). Changes in the oxygen content shift the frequency and the spatial field profile adjusts, allowing for large change in signal (since the field is no longer null at the location of the receiver). The launching and receiving structures can be dipole, loops or other antennas, or waveguides, including dielectric waveguides.

Another method that can be used to improve signal to noise ratio and/or to provide calibration, is to dither the response of the microwave. The oxygen content can be varied in such a way to assure full storage or no storage of oxygen, for example. The same can be done with urea (ammonia) dosing, or any other compound being monitored. In addition, it may be possible to add a foreign material (not present otherwise in the system) to assist in the calibration and characterization of the microwave sensor.

Still another method to improve sensitivity and detectability limits is to use FM modulation of the transmitted signal. Using modulation the signal varies over a range of frequencies, and the signal can be detected by using conventional signal processing techniques, including lock-in detection.

Figure 9:
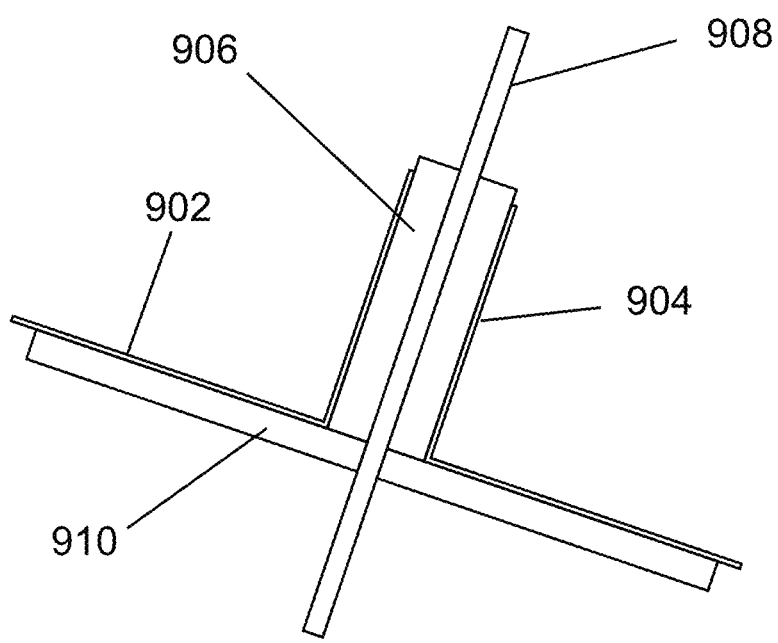
FIG. 9 depicts details of a microwave probe used to detect material accumulation.

FIG. 9 shows yet another measurement system, in which a probe consisting of an outer conducting sleeve 904 contains an inner conductor 908 and inner dielectric 906. The outer conducting sleeve 904 may be in electrical contact with a conducting surface 902, such as the wall of a cavity or waveguide. Deposition of conducting material 910 on the inner surface of conducting surface 902 forms an electrically conducting path between inner conductor 908 to conducting surface 902, thereby effectively shorting the probe depicted in FIG. 9. This readily allows material 910 to be detected.

Figure 10:
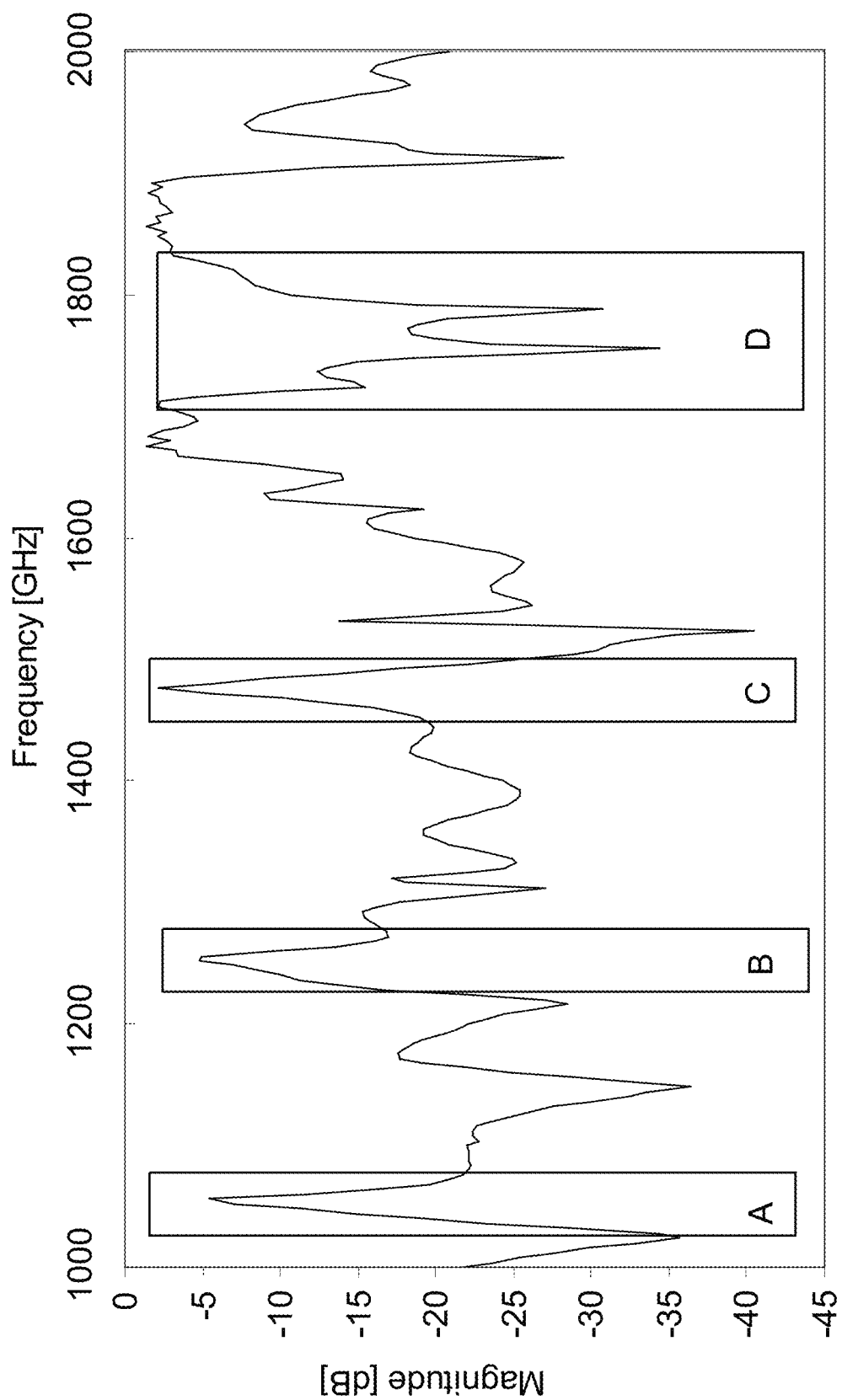
FIG. 10 represents cavity measurement data and illustrates a means for reducing the measurement time.

FIG. 10 presents a plot of several cavity resonant modes comprising a radio frequency resonant curve, spanning a 1 GHz frequency range. In one embodiment, the measurement time may be greatly reduced by sampling only those regions of the resonant curve of interest. For exampling sampling only regions A, B, C, and D, essentially hopping between modes, as opposed to sampling the full resonance curves, enables a significant reduction in measurement response time. In one example, the full resonance curve depicted in FIG. 10 may be sampled in 1,000 ms covering 1,000 frequency points, whereas regions A, B, C, and D may be sampled in 100 ms with each, covering 100 frequency points each.

FIGS. 11A, 11B, 11C, 11D, 11E, and 11F present the electric field distribution for three resonant modes within a measurement cavity for use with a disc-type element, such as a paper filter in one example. In FIGS. 11A, 11B, and 11C, a conductive mesh is placed immediately behind the filter in the filter plane. In FIGS. 11D, 11E, and 11F, a non-conductive grid is placed to support the filter in the filter plane. The figure depicts the radial and axial variations in the electric field distribution. Ideally, the paper filter is located in a region of high electric field, and the conducting filter support should enhance the field in the region of the paper filter.

Figures 12A, 12B, 12C:
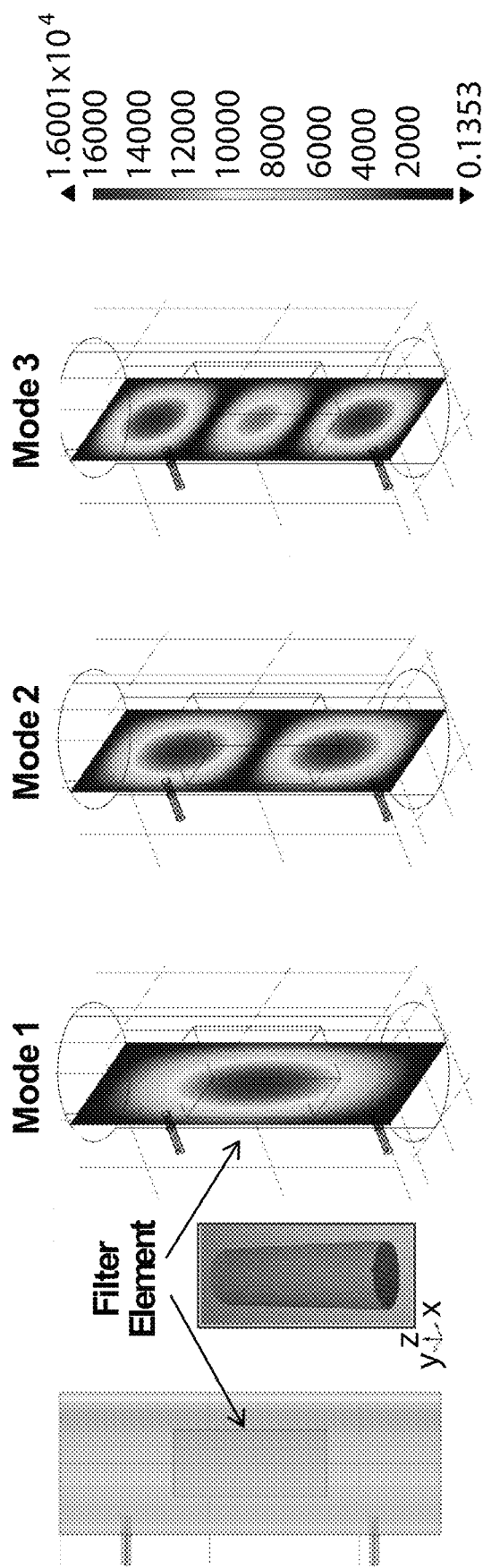
FIGS. 12A, 12B, and 12C depict specific electric field distributions in a third embodiment of a cavity measurement system.

FIGS. 12A, 12B, and 12C present additional electric field distributions for three resonant modes for a ceramic honeycomb element installed in a metallic housing. The figure shows the spatial distribution of the electric fields. The measurement sensitivity is highest in regions of high field strength (red and yellow) and lowest in regions of low field strength (blue).

Figure 13A:
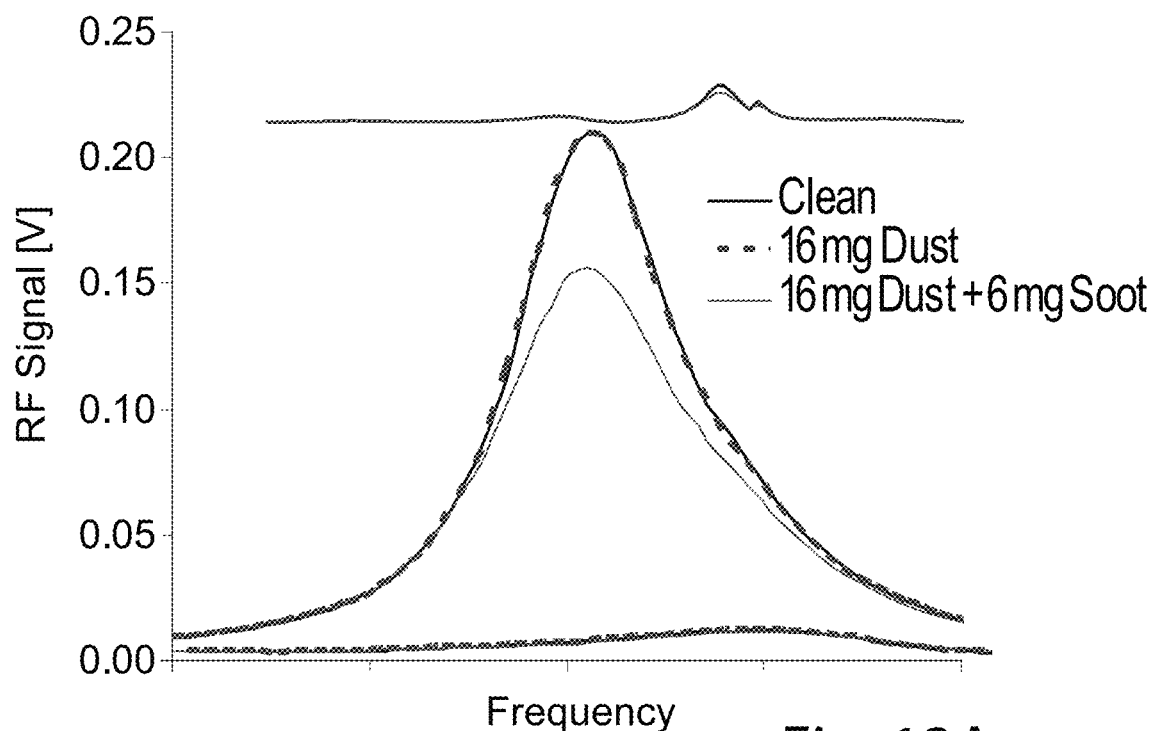
FIGS. 13A and 13B depict the effect of specific materials on two cavity resonant modes.
Figure 13B:
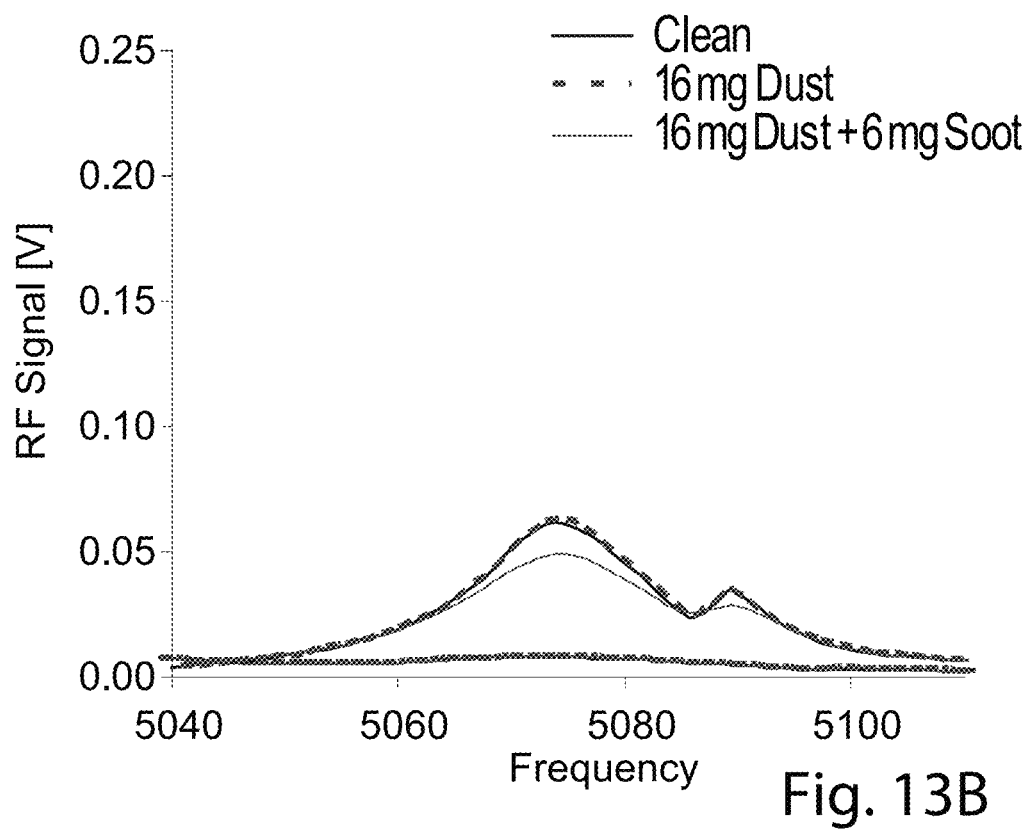
Figure 14:
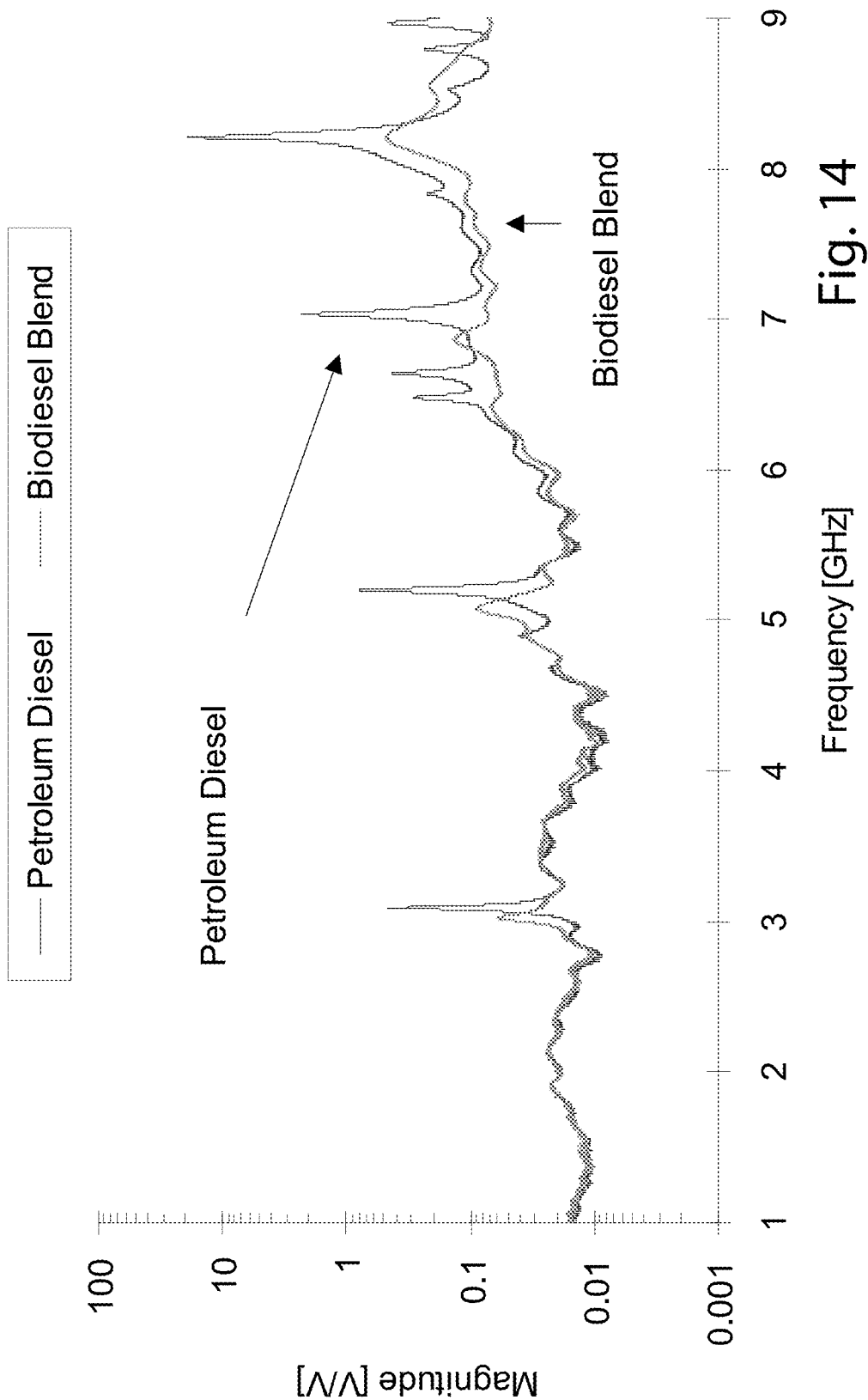
FIG. 14 depicts the effect of petroleum diesel and biodiesel blends on several cavity resonant modes.
Figure 15:
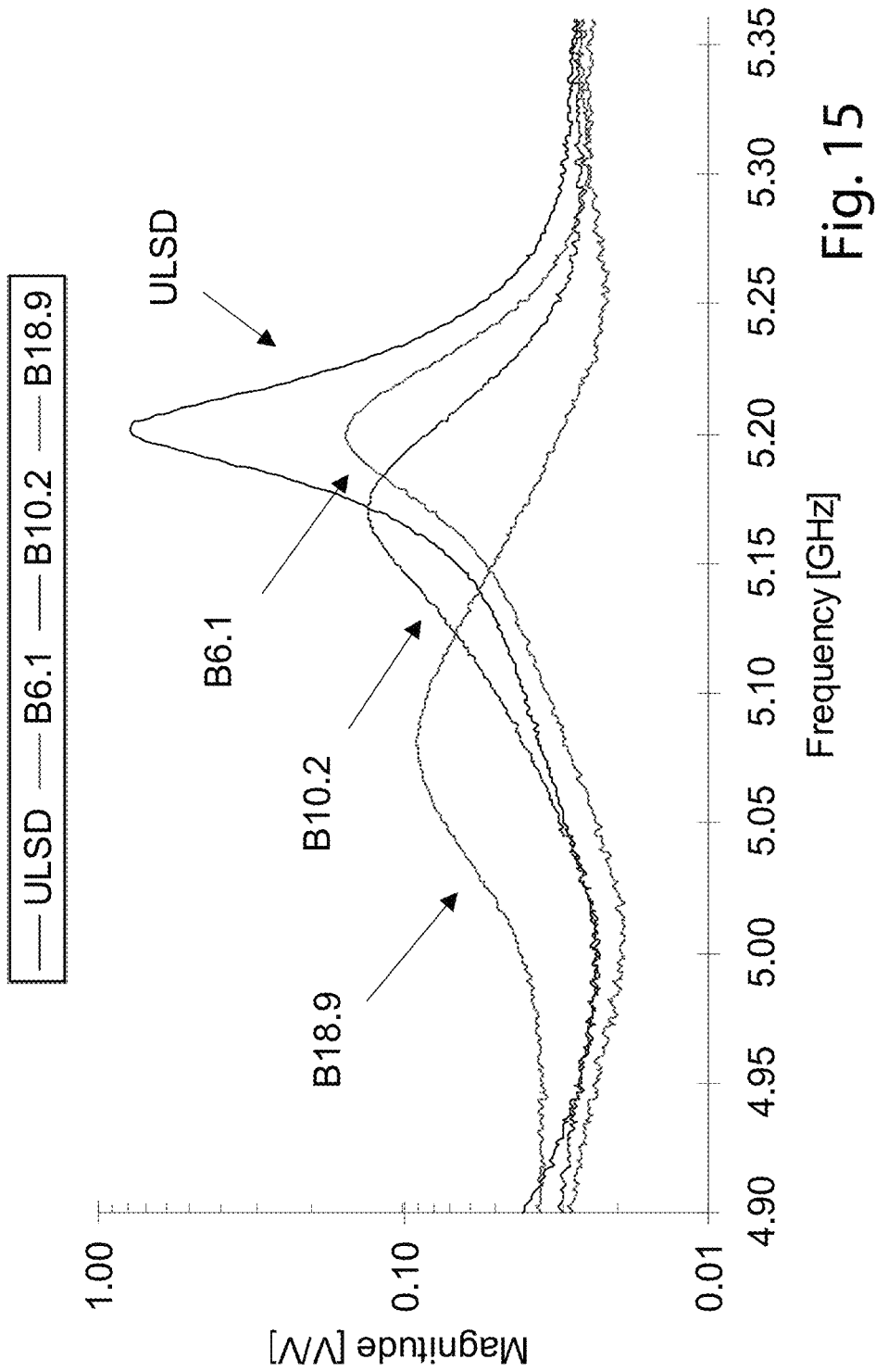
FIG. 15 depicts additional details of the effect of petroleum diesel and biodiesel blends on one cavity resonant mode.
Figure 16:
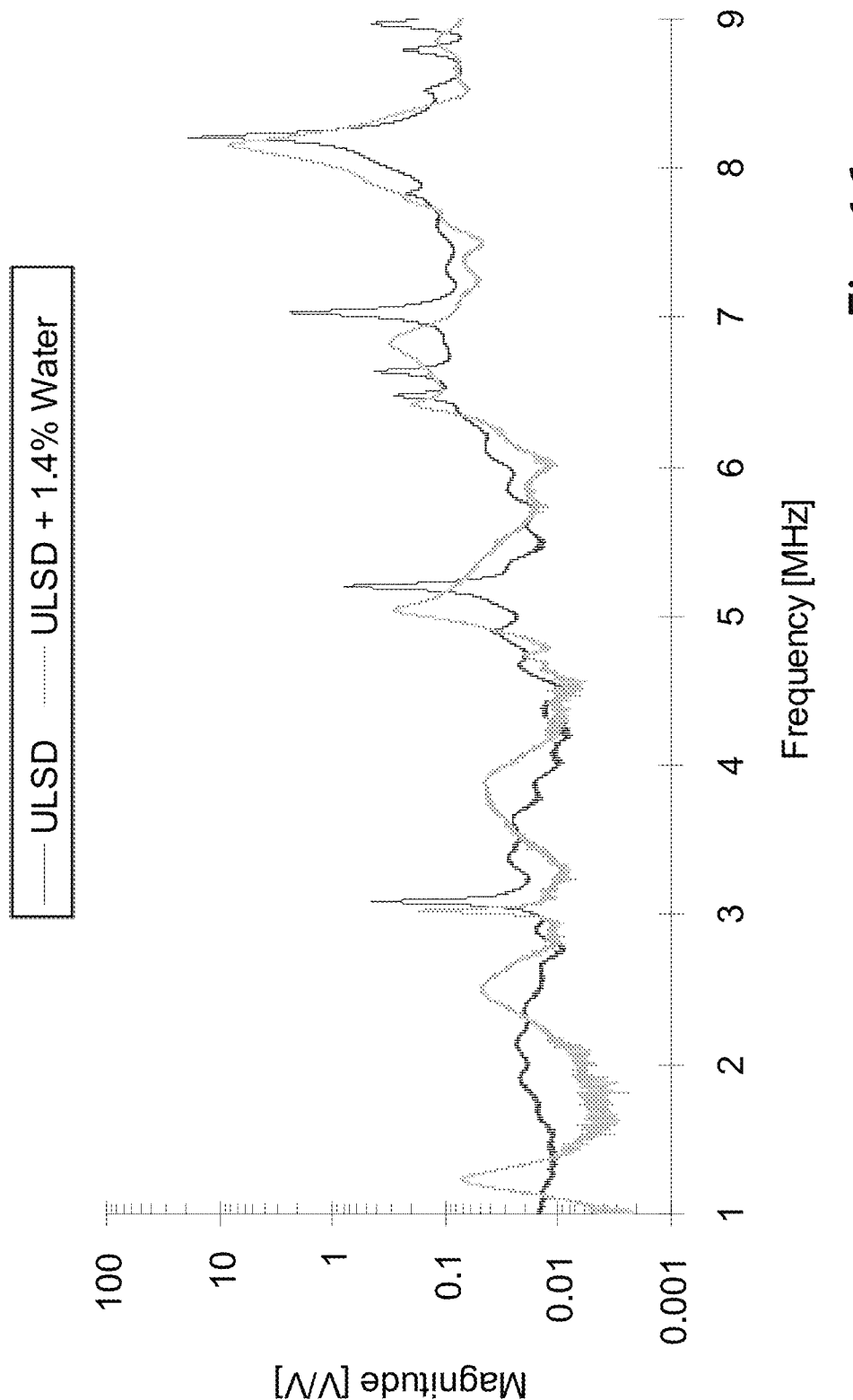
FIG. 16 depicts the effect of petroleum diesel and water on several cavity resonant modes.
Figure 17:
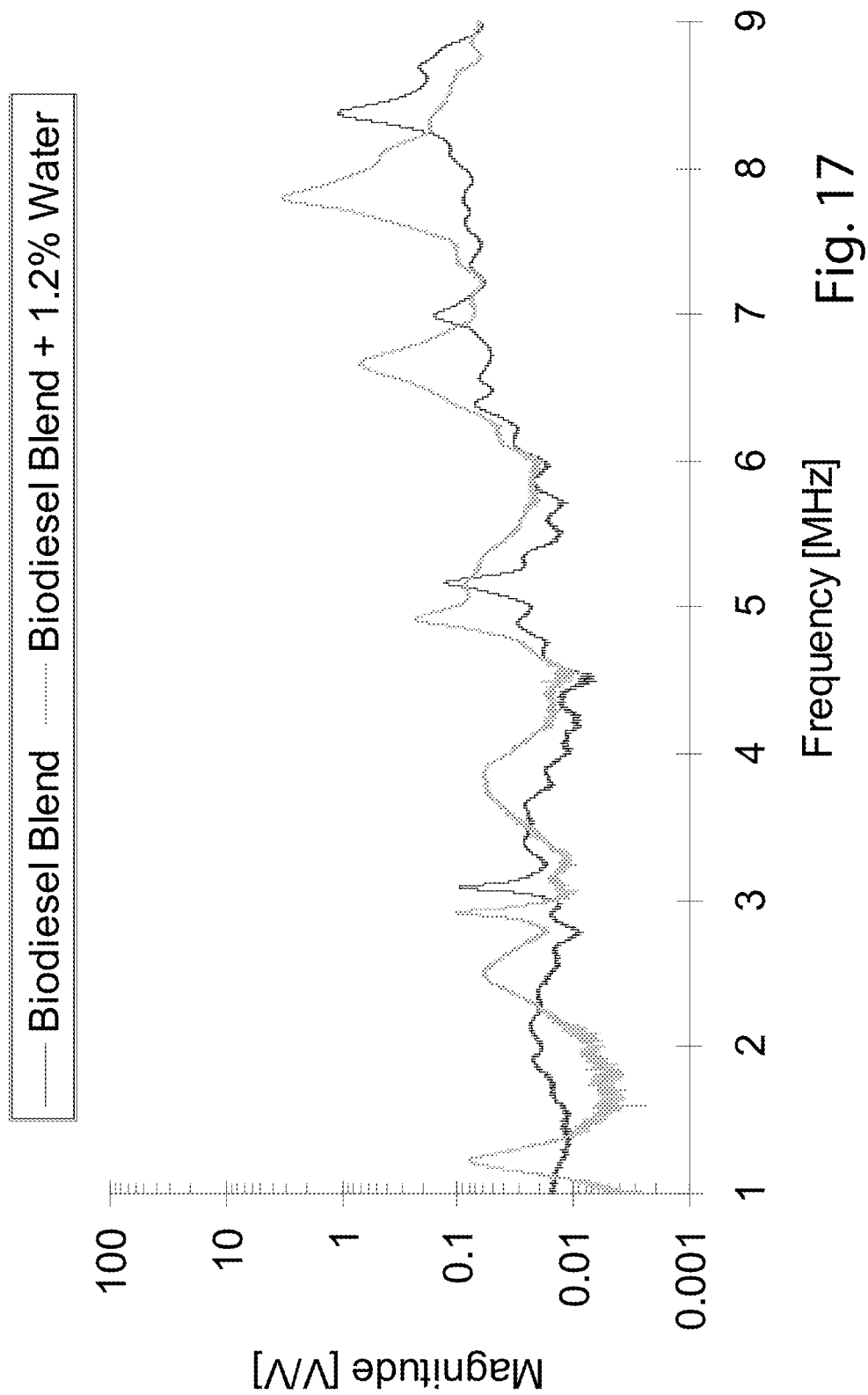
FIG. 17 depicts the effect of biodiesel and water on several cavity resonant modes.
Figure 18:
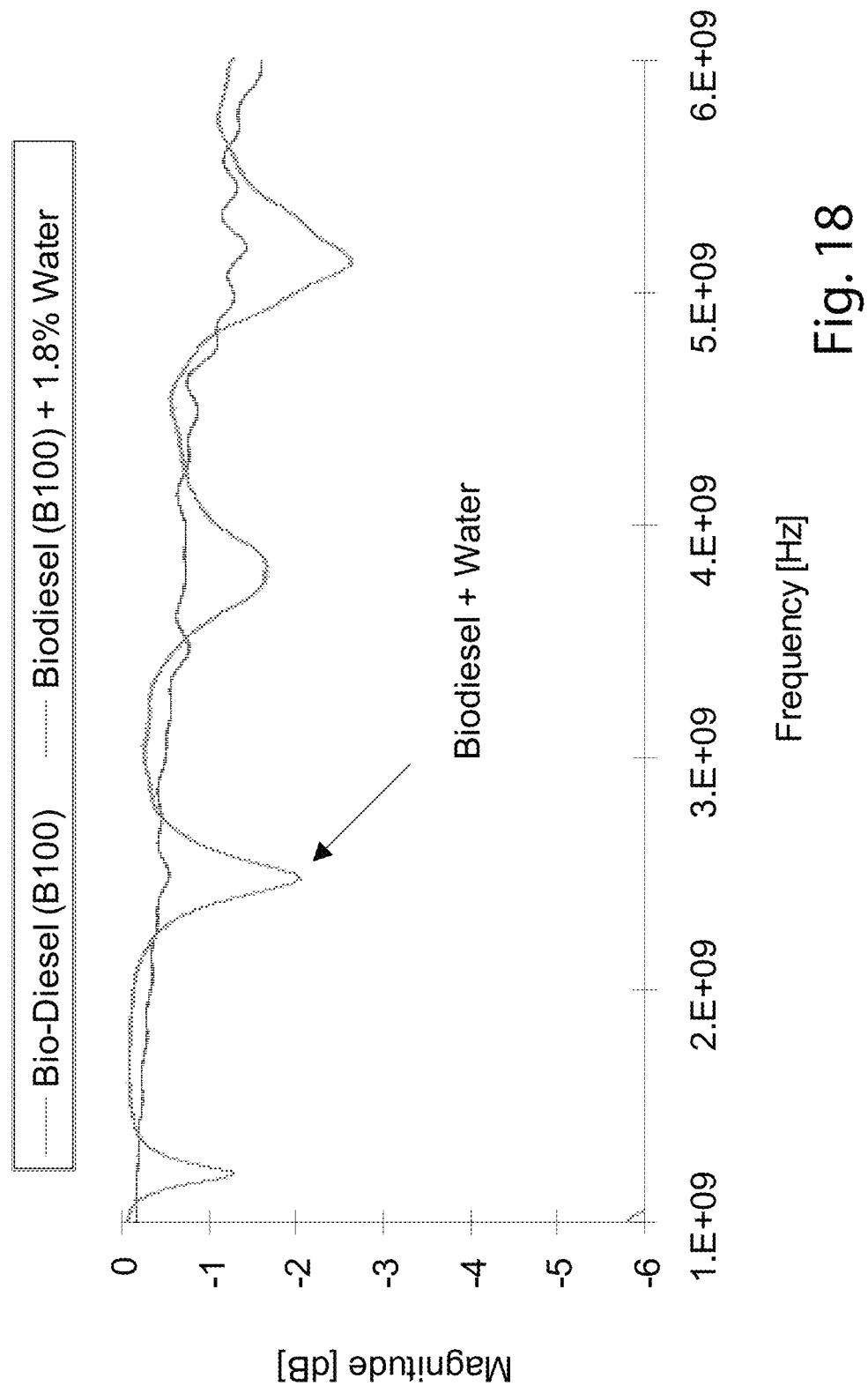
FIG. 18 depicts the effect of biodiesel and water on several cavity resonant modes.
Figure 19:
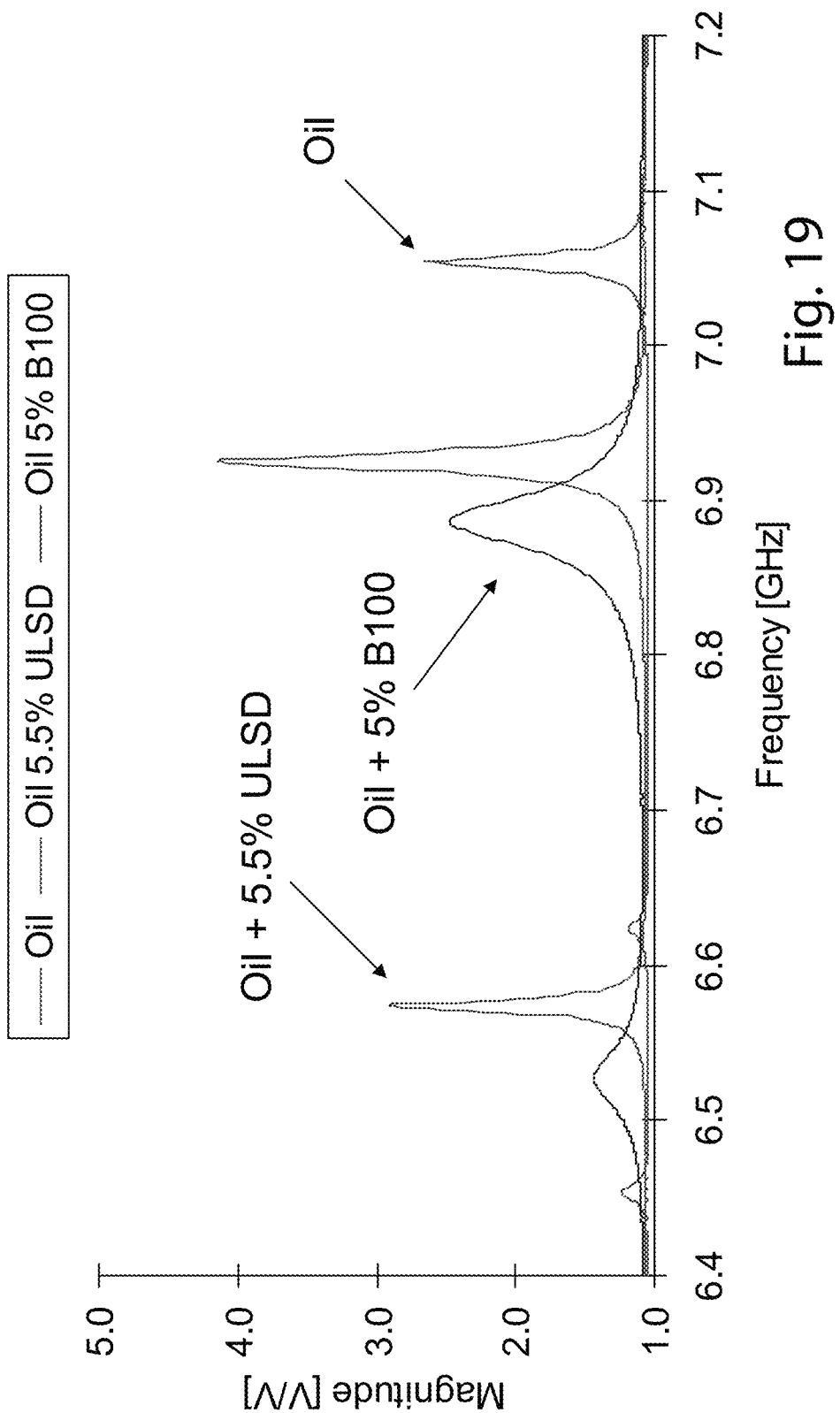
FIG. 19 depicts the effect of a blend of liquids on several cavity resonant modes.
Figure 20:
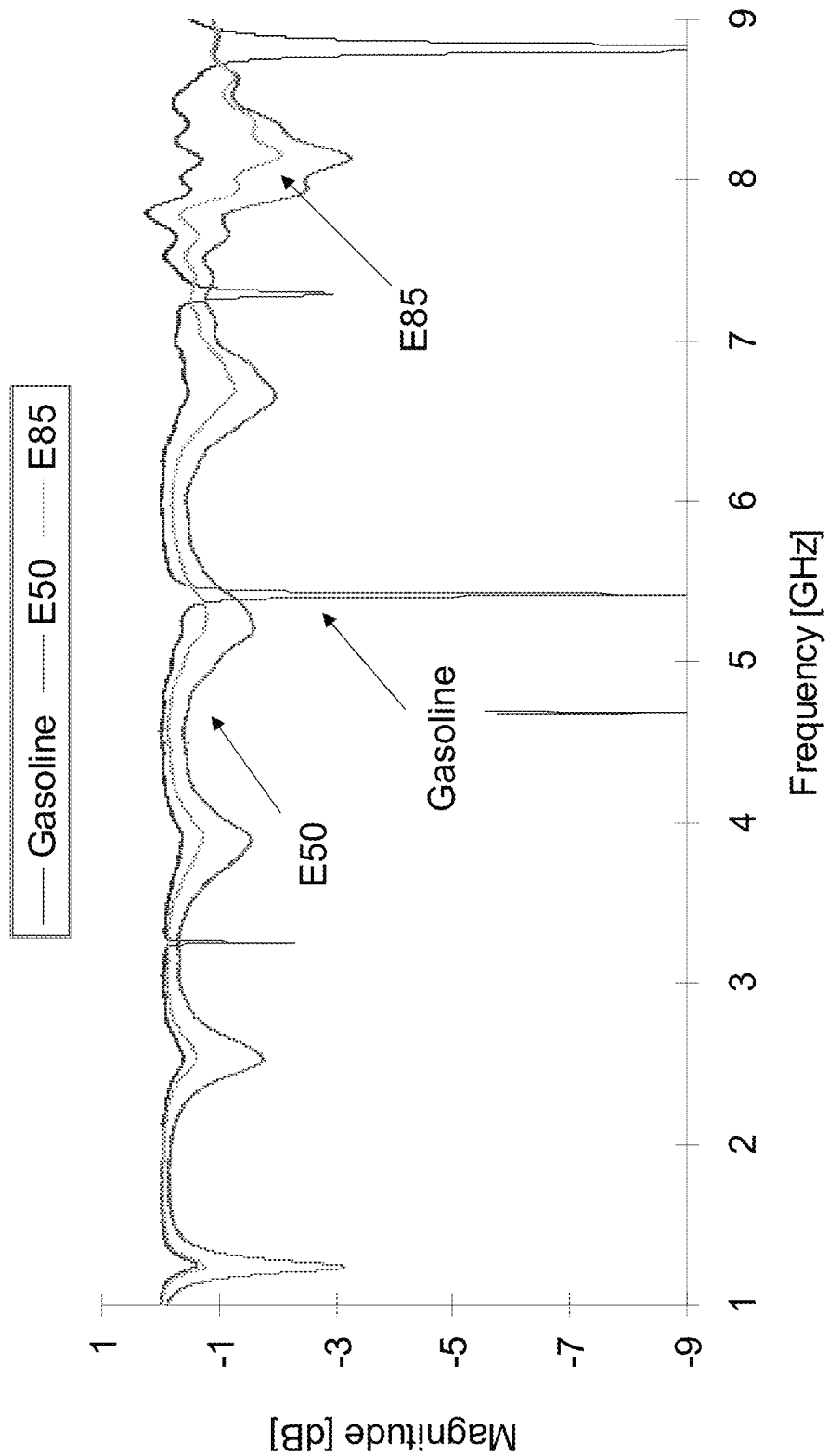
FIG. 20 depicts the effect of gasoline and ethanol blends on several cavity resonant modes.
Figure 21:
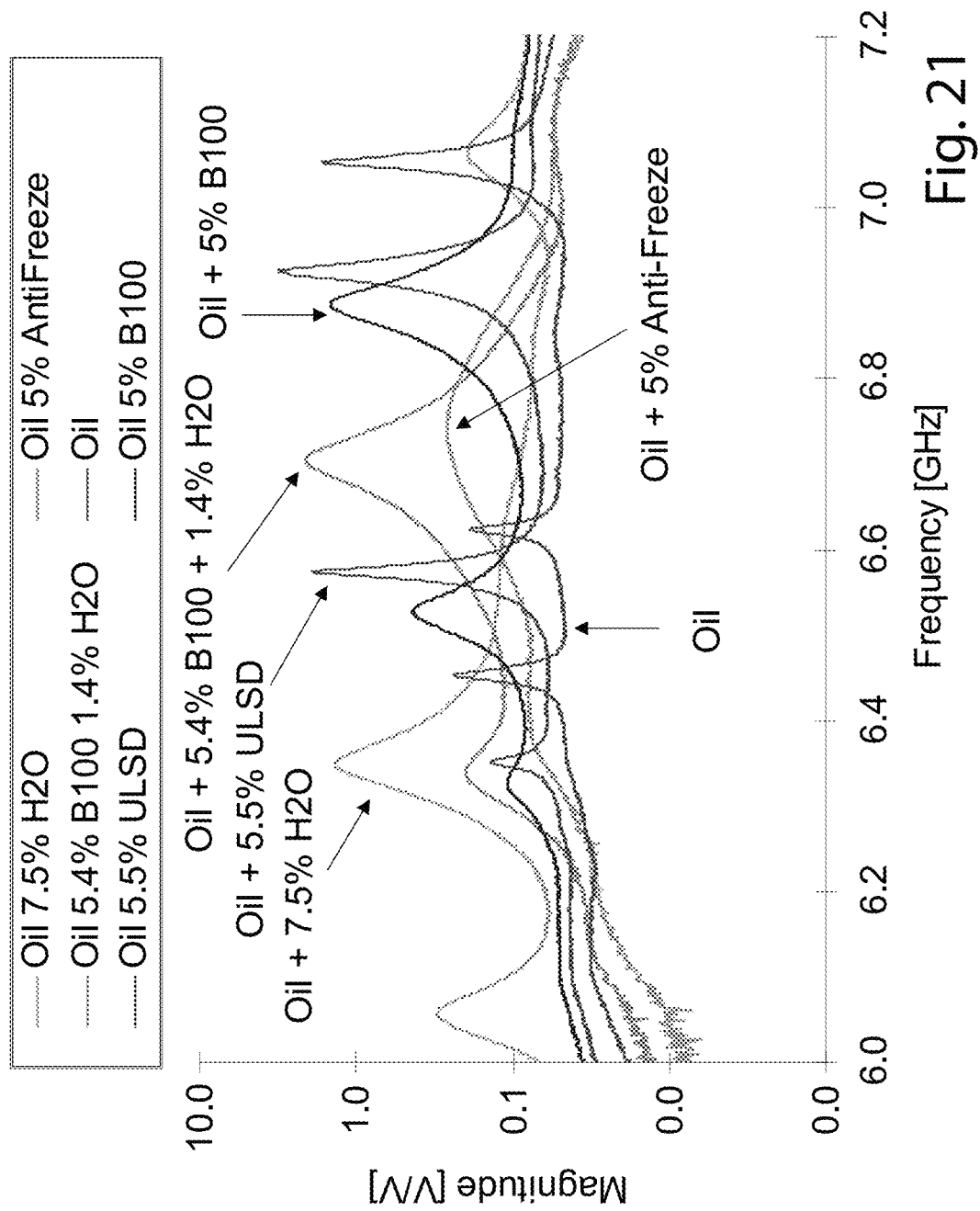
FIG. 21 depicts the effect of a larger number of blends on several cavity resonant modes.

FIGS. 13A and 13B show the effect of two different materials collected on a Teflon filter on two resonant modes. Black carbon shows a pronounced attenuation in the signal whereas the test dust does not affect the signal magnitude. The measurements illustrate the detection of a single component in a mixture of other materials.

FIGS. 14, 15, 16, 17, 18, 19, 20, and 21 show the application of cavity resonance measurements to monitor changes in the quantity and composition of material blends, such as liquids in cavities and flow-through conduits.

Figure 22:
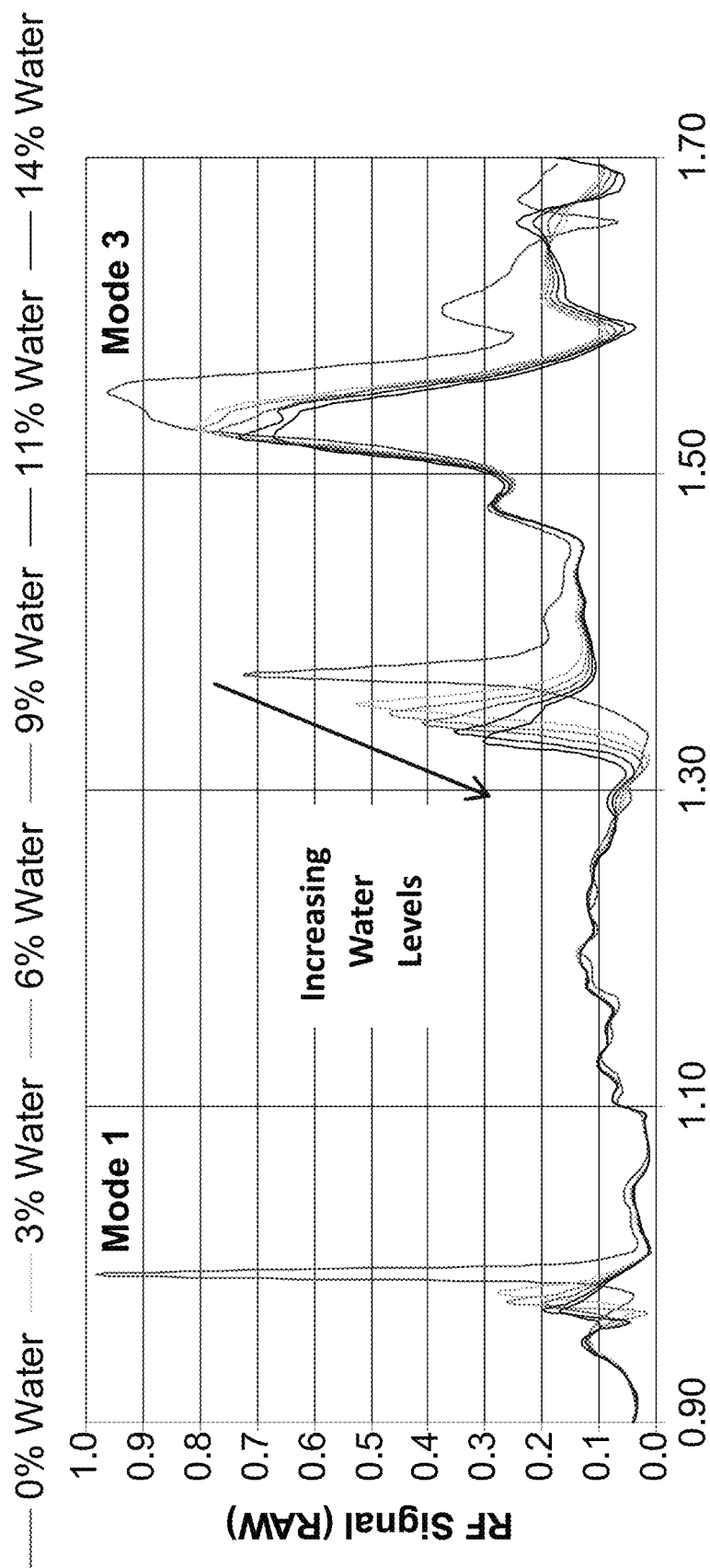
FIG. 22 depicts the effect of a moisture content in textiles on several cavity resonant modes.

FIG. 22 shows the application of cavity resonance measurements to determine the moisture content of textiles, such as clothes in a dryer, where the drum of the dryer serves as the cavity.

Figure 23:
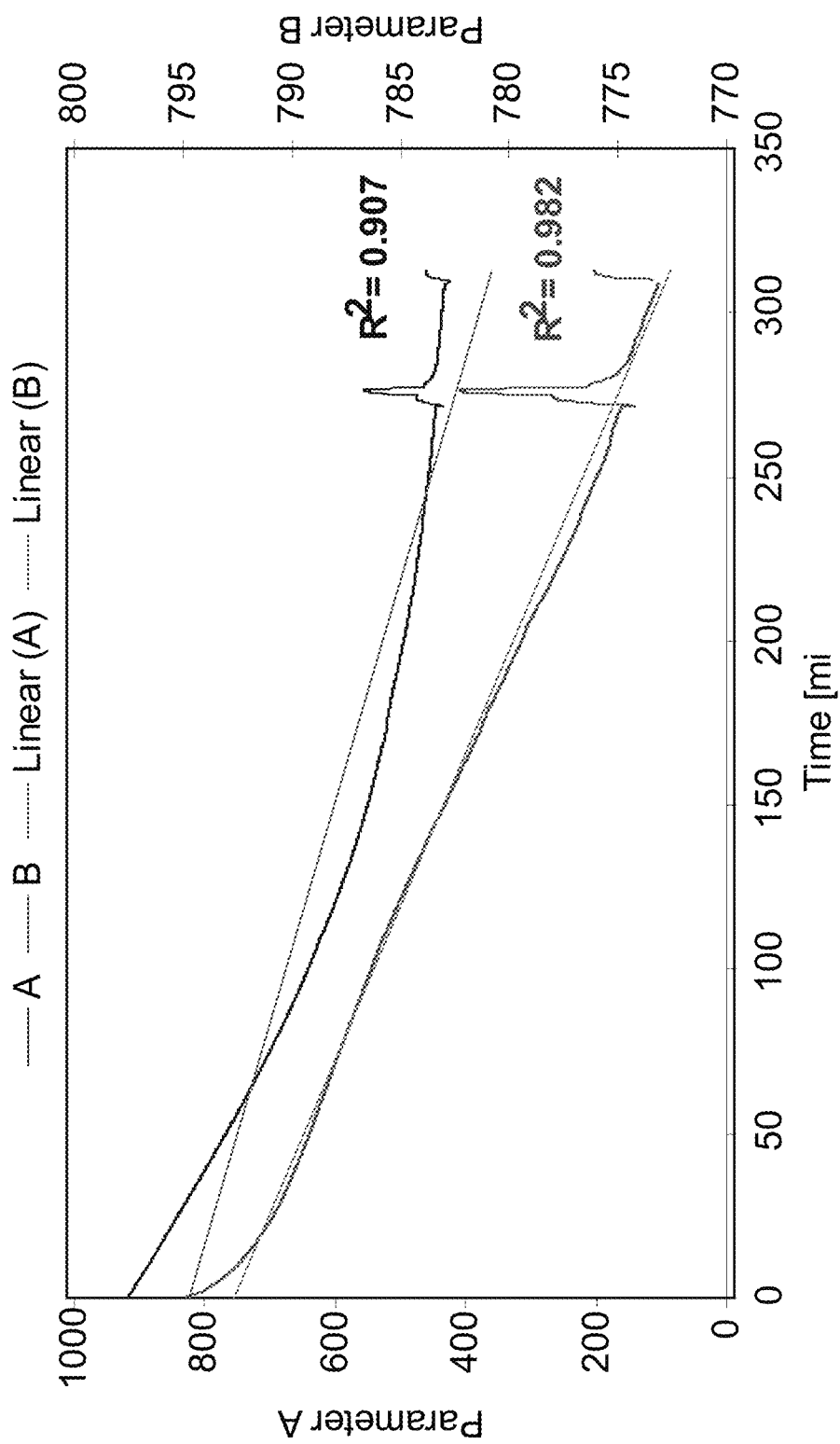
FIG. 23 illustrates extension of the cavity measurement range by monitoring phase.

FIG. 23 shows the preferential use of phase shift to extend the measurement range when monitoring lossy materials as opposed to magnitude measurements of the resonance curve. The results in FIG. 23 correspond to soot accumulation on a filter.

FIGS. 24A and 24B further illustrate one particular advantage of monitoring phase shift relative to amplitude for several resonances. The amplitude curves in FIG. 24A show the RF signal at a first condition (A) and at a second condition (B). At condition (B), the signal attenuation is significant, and the resonances (peaks) are difficult to distinguish, due to the high RF loss. In the case of amplitude, the signal is effectively saturated at condition (B).

On the other hand, measurements of phase (ii) in FIG. 24B show a distinct phase shift for condition (B) relative to condition (A). Monitoring phase, thus, provides up to 360 degrees of phase shift, significantly extending the RF measurement range, which would otherwise be limited by the saturation or loss of sensitivity in the amplitude signal for condition (B). Phase measurements are particularly advantageous in certain applications, such as monitoring soot loading in a particulate filter, in one example.

Measurements of phase may include the absolute or relative phase shift at a specific phase angle, such as the zero crossing or any other phase angle, the average phase at a given frequency or range of frequencies, the area under the phase curve, or any other parameter directly or indirectly derived from the phase measurements. The phase measurements may or may not be normalized to a reference condition, and may or may not be corrected to account for the influence of external variables such as temperature or moisture content, in one example, on the signal.

In an exemplary embodiment, both amplitude and phase measurements may be used. In another example, the absolute amplitude measurement or the relative amplitude measurement may be used for low loss measurements (for example, corresponding to light soot loading of a filter) and phase may be used for high loss measurements (for example, for high soot loading of a filter). Amplitude information may be used to correct the phase signal, or phase information may be used to correct the amplitude signal.

The phase slew rate (change in phase as the frequency is varied) shown in FIG. 24B can be selected by an appropriate choice of electromagnetic length (i.e., number of wavelengths) between the radio frequency source and the detector.

In one example relative to FIGS. 24A and 24B, the monitored radio frequency parameter may be determined from absolute or relative amplitude or phase measurements or some derivative thereof, such as a maximum or minimum value, average value, frequency shift, peak or resonance width at a given power level, quality factor, Q, or a related parameter. The parameter may be determined at a fixed frequency, or over a continuous or discontinuous range of frequencies. The frequencies may or may not include resonant conditions.

The rate of change, (Δ/t) of one or more measured radio frequency parameters, P, may be computed at a specific time, t, as follows:

$$(\Delta/t) = (P_{t-1} - P_t)/((t-1)-t) \qquad \text{Equation 1}$$

where the notation (t−1) indicates a measurement of the parameter P at a previous time and the subscript (t) indicates the current measurement time. In this manner the change in a monitored radio frequency parameter, may be determined over a given time interval.

Figure 25:
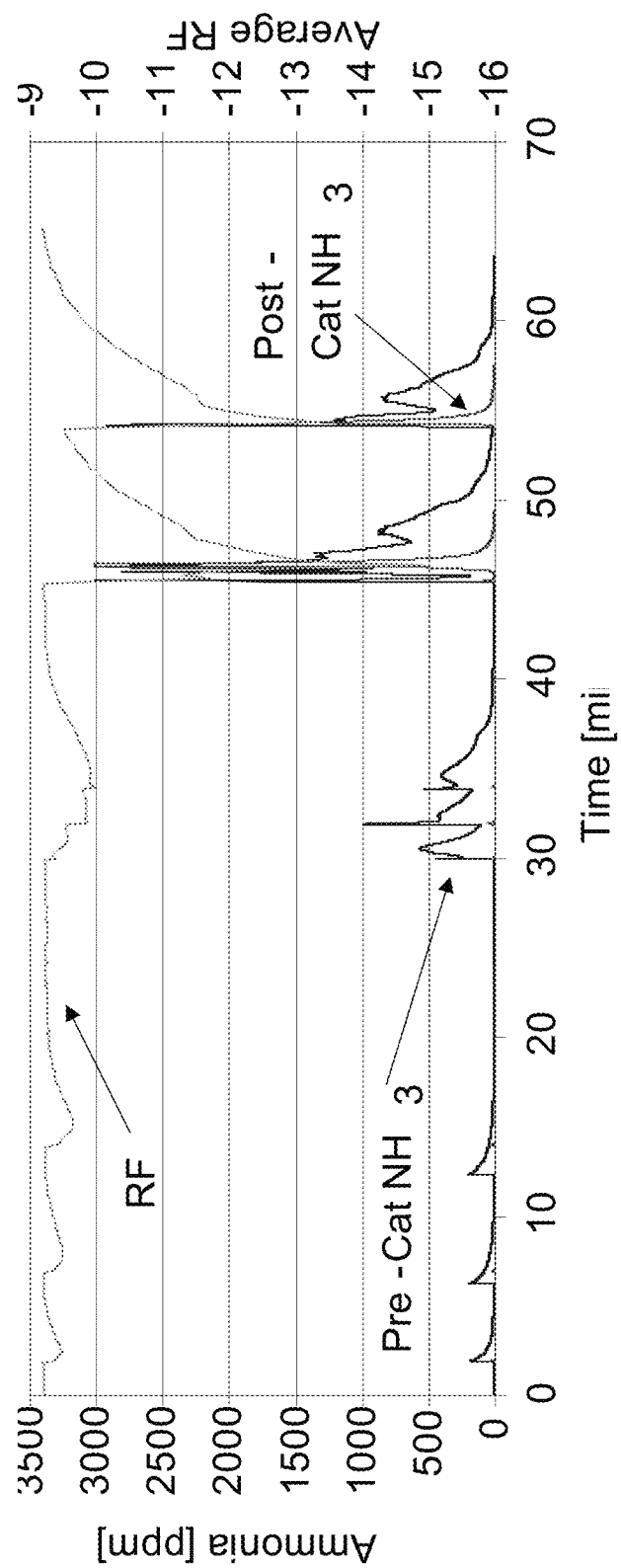
FIG. 25 depicts the impact of ammonia storage introduced by means of urea dosing on the radio frequency response of an SCR catalyst.

FIG. 25 provides another example showing the radio frequency response for a selective catalytic reduction system to urea injection events (ammonia adsorption) relative to measurements from pre- and post-catalyst sensors. The chart clearly shows an increasing RF response with increasing urea dosing and ammonia storage on the catalyst, including the impact of ammonia slip at high dosing rates. The results provide yet another example for monitoring gas species adsorbed on catalysts through microwave means.

The radio frequency measurements described herein may be used as part of a sensing, diagnostic, or control system to detect faults, such as for on-board diagnostics, in one example. In another example, the radio frequency or cavity waveguide measurements may be used to control a system by initiating or terminating an action.

It is intended that the examples and description provided in this disclosure be radio frequency cavity and waveguide state variable measurement system and methods disclosed are equally applicable to all types of diesel cavities and waveguides used in a wide range of applications.

What is claimed is:

1. A radio frequency measurement system, comprising:
   a sample conditioning system designed to control conditions of a sample;
   a first sensor disposed in a conduit disposed upstream of the sample conditioning system;
   a second sensor disposed in a conduit disposed downstream of the sample conditioning system;
   a cavity in communication with the sample conditioning system and disposed downstream of the sample conditioning system;
   at least one radio frequency probe configured to transmit and receive radio frequency signals through the cavity containing the sample; and
   a control unit configured to determine at least one characteristic of the sample based on the received radio frequency signals under the controlled conditions.

2. The radio frequency measurement system of claim 1, wherein the sample conditioning system adjusts a temperature of the sample.

3. The radio frequency measurement system of claim 1, wherein the sample conditioning system adjusts an amount of moisture in the sample.

4. The radio frequency measurement system of claim 1, wherein the first sensor is a temperature sensor and the second sensor is a temperature sensor, wherein the control unit uses closed loop control to control the temperature of the sample.

5. The radio frequency measurement system of claim 1, wherein the sample conditioning system includes a chiller.

6. The radio frequency measurement system of claim 1, wherein the first sensor is a moisture sensor and the second sensor is a moisture sensor, wherein the control unit uses closed loop control to control the moisture condition of the sample.

7. The radio frequency measurement system of claim 6, wherein the sample conditioning system includes a desiccant.

8. A radio frequency measurement system, comprising:
   a sample cavity having a port for introducing a sample;
   a measurement cavity;
   a movable filter element passing between the sample cavity and the measurement cavity;
   at least one radio frequency probe configured to transmit and receive radio frequency signals through the measurement cavity; and
   a control unit configured to determine at least one characteristic of the sample based on the received radio frequency signals.

9. The radio frequency measurement system of claim 8, wherein the movable filter element is a strip filter disposed on a first roll and a second roll, wherein the filter element is advanced from the sample cavity to the measurement cavity by rotating the first roll and the second roll.

\* \* \* \* \*